United States Patent [19]

Ohtsubo et al.

[11] Patent Number: 5,287,171

[45] Date of Patent: Feb. 15, 1994

[54] JITTER PROCESSING CIRCUIT FOR DIGITAL CAMERA PROCESSING

[75] Inventors: Hiroyasu Ohtsubo, Yokohama; Kazuhiro Koshio, Chigasaki, both of Japan

[73] Assignee: Hitachi, Ltd., Tokyo, Japan

[21] Appl. No.: 783,995

[22] Filed: Oct. 29, 1991

[30] Foreign Application Priority Data

Oct. 31, 1990 [JP] Japan .................................. 2-292012
Nov. 5, 1990 [JP] Japan .................................. 2-297299

[51] Int. Cl.$^5$ ........................................... H04N 9/077
[52] U.S. Cl. .................... 348/500; 348/642; 348/222
[58] Field of Search ............ 358/17, 23, 41, 43, 358/44, 148, 150, 158; H04N 9/077

[56] References Cited

U.S. PATENT DOCUMENTS

| | | | |
|---|---|---|---|
| 4,620,222 | 10/1986 | Baba et al. | 358/44 |
| 4,654,708 | 3/1987 | de la Guardia et al. | 358/148 |
| 4,686,567 | 8/1987 | Burdick | 358/150 |
| 4,689,664 | 8/1987 | Möring et al. | 358/23 |
| 4,692,889 | 9/1987 | McNeely | 358/23 |
| 4,700,219 | 10/1987 | Tanaka et al. | 358/41 |
| 5,008,740 | 4/1991 | Phillips et al. | 358/23 |
| 5,138,320 | 8/1992 | Ngo et al. | 358/148 |

FOREIGN PATENT DOCUMENTS 63-45153 5/1984 Japan .

OTHER PUBLICATIONS

Proceedings of the Institute of Television Engineers of Japan, vol. No. 11 (1987), pp. 983-990.

*Primary Examiner*—James J. Groody
*Assistant Examiner*—Jeffrey S. Murrell
*Attorney, Agent, or Firm*—Antonelli, Terry, Stout & Kraus

[57] ABSTRACT

A video camera in which an output signal from a solid-state image sensor is converted into a corresponding digital signal at a horizontal reading cycle of the output signal, and the digital signal is digital-processed with a first predetermined clock (fs) synchronous with the reading cycle to provide a luminance signal and a color difference signal. This video camera comprises data clock converter circuit for latching the color difference signals generated in synchronism with the first clock with a data latch clock synchronous with a second clock (4 fsc) to thereby convert the clock for the color difference signal; a control circuit for detecting the phase of the changing point of the color difference signal to provide a phase detecting signal and supply said data latch clock with which color deference signal is latched synchronously with said second clock (4 fsc) at a stable point after the changing point of the color difference signal generated in synchronism with the first clock (fs); a phase correction circuit for receiving the color difference signal from said data clock converter circuit and producing a phase-corrected color difference signal; and a modulation circuit for quadrature-balance-modulating the color difference signal supplied from said phase correction circuit to provide a modulated color signal.

3 Claims, 19 Drawing Sheets

JITTER PROCESSING CIRCUIT FOR DIGITAL CAMERA PROCESSING

BACKGROUND OF THE INVENTION

The present invention relates to a video pickup device which is driven by digital-processing a luminance signal and a color difference signal.

In recent years, the propagation rate of home video cameras has increased rapidly. The reasons for this are. 1) compactness/light weight, 2) low cost, 3) improvement of characteristics such as high image quality, and 4) improvement of usability due to the development of a movie in which a VTR (Video Tape Recorder) unit and a camera unit are integrated. And it could be noted that 1) a solid state image sensor and 2) rationalization of signal processing have greatly contributed to realization these characteristics.

Generally, solid state image pick-up devices have many characterisitics such as compactness/light weight, high reliability, etc. At the beginning of development, those devices were inferior to camera tubes in their production cost, sensitivity and resolution, etc. With rapid development of semiconductor technology, the solid state video camera has exceeded the camera tubes in the above-mentioned qualities, as well as in production cost and performance. At present, almost all home video cameras adopt the solid state video camera. The history of development of video cameras hitherto made is disclosed in Proceedings of The institute of Television Engineers of Japan, Vol. No. 11 (1987), pp. 983-990.

On the other hand, the signal processing circuit intended to improve signal processing and also to be designed in an IC for the purpose of realizing its compactness, low cost and high performance. As a result, the improved signal processing circuit coupled with above solid state camera has realized the high quality, drastic compactness/light weight and low cost of the home video cameras. However, the analog signal processing system adopted hitherto has a certain limit in further rationalizing the signal processing. In the future, a digital signal processing system, which has the following features, will become the most prevalent signal processing system.

1) It permits a filter which is a bulky component to be integrated in an IC with high accuracy.

2) It can be designed within a single chip by incorporating A/D and D/A converters.

3) It can be designed sufficiently considering deterioration of S/N due to rounding error of calculation thereby to easily realize the signal processing circuit with high S/N ratio.

An example of the signal processing in such a video camera is disclosed in Japanese Patent Publication No. 63-45153.

FIG. 1 a block diagram of the video camera in which the conventional analog signal processing unit is designed in a digital system.

In FIG. 1, in response to an input optical signal, a sensor 1 produces an analog pixel signal 12, for each horizontal read scanning period, which is synchronous with a read clock frequency (hereinafter referred to as sensor clock) and consisting of alternately repeated different color signals. The operation of the sensor 1 is controlled by the control signal sent from the sensor driving timing generating circuit (hereinafter abbreviated to TG).

The analog pixel signal 12 is A/D converted by an analog/digital converter (hereinafter abbreviated to A/D) to provide a digital pixel signal 13. A digital signal processing circuit 3, when it receives the digital pixel signal 13, a synchronization (sync) signal 20 and a control signal 23 from a synchronization signal generating circuit (hereinafter abbreviated to SSG) and the control signal 18 from TG 5, produces a luminance signal 14 and a color signal 15 supplemented with the sync signal 20, respectively. These signals 14 and 15 are D/A converted by a digital/analog converter (abbreviated to D/A) to provide an analog luminance signal 16 and an analog color signal 17 supplemented with the sync signal 20, respectively.

An explanation will be given of the control signal 18 generated by TG 5 and the sync signal 20 and the control signal 23 generated by SSG 8. First, SSG 8, when the signal 60 at a frequency of n·fsc is supplied as a clock from an oscillator 61 with an oscillation frequency of n·fsc (n: an integer; and fsc: the frequency of a color subcarrier), produces a horizontal sync signal (hereinafter referred to as CHD) and a vertical sync signal (hereinafter referred to as VD) which are necessary to generate a sensor driving signal; these two signals 19 are supplied to TG 5. In response to the signal fs from an oscillator 51 and CHD, TG 5 produces a sensor clock fs. On the other hand, in response to the clock signal at nfsc, SSG 8 produces synchronization (sync) signals 20 such as a composite sync signal (CSYNC), a composite blanking signal (CBLK), a burst flag signal (BF), etc. The digital signal processing circuit 3, in response to the sensor clock nfsc, produces the luminance signal and a color difference signal supplemented with the sync signals 20 to provide the luminance signal 14 and the color signal 15 (which is further modulated by the control signal 23), respectively. The art related to the system described above is disclosed in Japanese Patent Publication No. 63-45153.

There are many problems to be solved in digitizing the signal processing in the video camera provided with a CCD sensor, which is the sensor (solid state image pick-up device) in the prior art shown in FIG. 1. One problem is digitizing the encoder for a color signal.

The present CCD sensor adopts several values as the number of horizontal pixels. Since the horizontal scanning period is fixed, there are different frequencies of horizontal pixel read clock (sensor clock) corresponding to the number of pixels. For example, the sensor clock frequency (fs) for an NTSC color television system includes the values of 9.5 MHz, 12.7 MHz, 14.3 MHz, etc. Generally, the signal processing in the digital camera is desired to be performed in a processing synchronous with the sensor clock because of its easiness and merit of small-sized circuit. Now it should be noted that the signal processing in the encoder must be done with the clock n (n : 3 or 4) times as large as fsc. Therefore, if in digitizing all the signal processings in a camera, the relation fs=n·fsc (n=3, 4, 6, 8, etc.) is not satisfied (the phase of a high clock is not fixed for), jitter of $(n·fs)^{-1}$ is generated to transfer the data to the encoder. Now if n=4, the jitter is NTSC : $(4fsc)^{-1}=70$ ns, and PAL : $(4fsc)^{-1}=56$ ns.

The value of jitter permitted for the color signal is 35 ns or less so that it is apparent that the above jitter are not permitted. It was found that n must be 8 or greater in order to limit within the permitted value. However, actually, the signal processing based on the oscillation at 8 fsc (NTSC : 28.6 MHz, PAL : 35.44 MHz) suffers from the following defects:

1) the oscillation is likely to be unstable to require the strict specifications for an oscillator. The power consumption of the oscillator is doubled, and 2) the speed for a gate used in an encoder circuit is required to be twice as high as before so that the strict specifications are required for components. The power consumption for the encoder circuit is increased. For this reason, actually, the signal processing is desired to be done at the clock at 4 fsc or less. Incidentally, digitizing the encoder is not referred to in the above Japanese Patent Application No. 63-45153.

Further, the prior art shown in FIG. 1 also has the following defect. In converting the signal processing system in the video camera from an analog system to a digital system, no consideration regarding the synchronization of a luminance signal with a sync signal when the luminance signal is supplemented with the sync signal is made although the luminance signal is synchronous with the sensor clock fs and the sync signals such as CSYNC are synchronous with n·fsc.

FIG. 2 is a timing chart showing the relationship between the sensor clock fs, and CSYNC before it is added to the luminnance signal and CSYNC after it has been added thereto. As seen from FIG. 2, if the rising edge 104 of the sensor clock 101 has the same timing as the falling edge 106 of CSYNC, CSYNC is latched at the rising edge 104 so that it remains unvaried and the waveform 102 after is later added to the luminance signal; on the other hand, CSYNC is latched not at the rising edge 104 but the rising edge 105, and SYNC is later added to the luminance signal having the waveform 103. In this case, the timing difference between CSYNC 102 and CSYNC 103 in their falling edge is 1/fs. For example, the number of sensor clock in the horizontal period of the sensor is 550, 1/fs=1H/550=115 ns. Such a large timing difference will produce jitter in the output image which is visible to human eyes.

Further, since the horizontal read clock frequency in the sensor for TG5 is fixed at a certain value, the video camera cannot deal with the sensor fixed at a different clock frequency; the video camera does not have sufficient versatility.

SUMMARY OF THE INVENTION

An object of the present invention is to provide a video camera with its all the signal processings being digitized including that in an encoder which can put, within a permitted range (35 ns or less), the jitter generated when 4 fsc is used as the data processing clock in the encoder, and is suitable to implement its low power consumption and small-size/light weight.

Another object of the present invention is to provide a video camera comprising a digital signal processing circuit which prevents jitter from being generated on an output image, and a programmable SSG which is controlled by a microcomputer to make the timing of the sync signal variable thereby accommodating sensors having several specifications.

In order to put the jitter within the permitted value, the video camera according to the present invention comprises an A/D converter means for converting the output signal from a CCD sensor into a digital signal synchronously with a sensor clock; a signal processing means for processing the digital sensor output from the A/D converter means on the basis of a sensor clock to generate a luminance signal and a color difference signal; an encoder means for balance-modulating the color difference signal on the basis of a clock at the period of 4 fsc (referred to 4 fsc clock); and a D/A converter means for converting two digital signals of the luminance signal and the color signal after modulation generated by the encoder means into analog signals, respectively. The video camera according to the present invention further comprises a data clock converter means for latching the color difference signal with the cycle of fs/m (m=1, 2, 3, 4, ...) generated by the signal processing means on the basis of the sensor clock by a latch pulse generated on the basis of 4 fsc clock generated by a control circuit described later, thereby producing a converted data clock; a control means for generating the latch pulse to be supplied to the data clock converter means on the basis of the 4 fsc clock from the phase reference signal (for example, a latch pulse at the final stage of the color difference signal) providing the changing phase of the color difference signal with fs/m cycles ouputted from the signal processing means based on the sensor clock, and also for detecting the relative phase between the phase reference signal and the 4 fs clock at the respective timings of the rising edge and falling edge of the 4 fsc clock to control a phase correction circuit described using the detected signal; and a phase correction means for phase-correcting the color difference signal supplied from the data clock converter means on the basis of the phase detected signal supplied from the control means and for supplying the color difference signal after correction to the encoder means.

Further, in order to prevent the jitter from being generated, which is another object of the present invention, a sync signal generating circuit (SSG) is provided to comprise an nfsc unit for generating a horizontal sync signal and a vertical sync signal for a sensor using the signal at the frequency of nfsc as a clock and a fs unit for generating the sync signal for generating a television signal.

Another arrangement comprises a signal switching circuit for alternately supplying the sync signals for the luminance signal and the television to the D/A converter means and a clock switching circuit for alternately supplying the clock at the frequency nfsc and the sensor clock fs as a clock for the D/A converter.

Still another arrangement comprises a programmable SSG which can change the timing of the sync signal for the television generated by the fs unit in order to accommodate with several sensors and a microcomputer for controlling it.

In the first arrangement, the control circuit detects the phase relationship between the phase reference signal and the 4 fsc clock with accuracy of $(8 \text{ fsc})^{-1}$ by detecting it at the rising edge and falling edge of the 4 fsc clock, and the phase correction circuit detects the amount of jitter due to the detected phase relationship to replace the color difference signals having the jitter supplied from the data clock converter means by the data interpolated from adjacent data before and after latch, thus making the phase correction for the color difference signals. In this interpolation processing, the ratio of the adjacent data to be added can be changed to create the data in any phase. Therefore, the accuracy of phase correction depends on the detection accuracy so that the amount of jitter remaining after the phase correction is equivalent to the detecting accuracy. Thus, the amount of jitter of the color difference signals after the phase correction is equal to $(8 fsc)^{-1}$ which is within a permissible range for the color signal. In this way, the problem of jitter occurring in the digital encoder can be solved.

In the second arrangement, when the clock at the frequency of nfsc is supplied, the nfsc unit performs a timing generating processing by a counter, etc., to generate a horizontal sync signal (CHD) and a vertical sync signal (VD) for the video camera which are to be supplied to TG. TG generates a sensor clock fs using a signal synchronous with CHD and supplies several kinds of control signals including the sensor clock fs to the digital signal processing circuit and the fs unit in SSG. The digital signal processing circuit performs a signal processing using the sensor clock fs as a clock to generate the luminance signal and the color difference signal. On the other hand, using the sensor clock fs as a clock, the fs unit also generates the sync signals such as a composite sync signal (CSYNC) for a television. Therefore, the luminance signal and the sync signals are synchronous with the sensor clock fs so that the luminance signal is synchronous with the sync signals. Thus, when the digital signal processing circuit supplements the luminance signal with the sync signals, a large timing difference which produces any jitter is not generated.

In the third arrangement, during a horizontal blanking period and at the time (point A) when the level of the luminance signal is at a predetermined level before the horizontal blanking period and horizontal synchronizing period, the signal switching circuit is switched on the side of the sync signals and also the clock switching circuit is switched on the side of the nfsc so that the sync signals are supplied, using the nfsc clock, to the D/A converter circuit from which analog sync signals are produced. Likewise, during the horizontal blanking period and at the time (point B) when the level of the luminance signal is at a predetermined level after the horizontal blanking period, the signal switching circuit and the clock switching circuit are switched on the sides opposite to the above cases so that an analog luminance signal is produced from the D/A converter circuit. Therefore, even if the luminance signal and the sync signals are not synchronous with each other at the points A and B, because of the level of the luminance signal being fixed, no jitter is generated.

In the fourth arrangement, if the timing data, the control signals, such as a sensor clock, and a vertical sync signal are supplied from the microcomputer, TG and the nfsc unit, respectively, with the timing data held in a state holding circuit, the fs unit processes the value of a counter using the sensor clock fs as a clock and the timing data held in the state holding circuit thereby to generate a horizontal sync signal and synthesizes the horizontal sync signal and the vertical sync signal supplied from the nfsc unit, thereby generating sync signals. Thus, if the timing data supplied from the microcomputer to the fs unit are set for the specification of a sensor used, the sync signals applied to the sensor can be generated, thereby realizing versatility for plural sensors.

DESCRIPTION OF THE PREFERRED EMBODIMENTS

Now referring to the accompanying drawings, an explanation will be given of several embodiments of the present invention.

Figure 3:
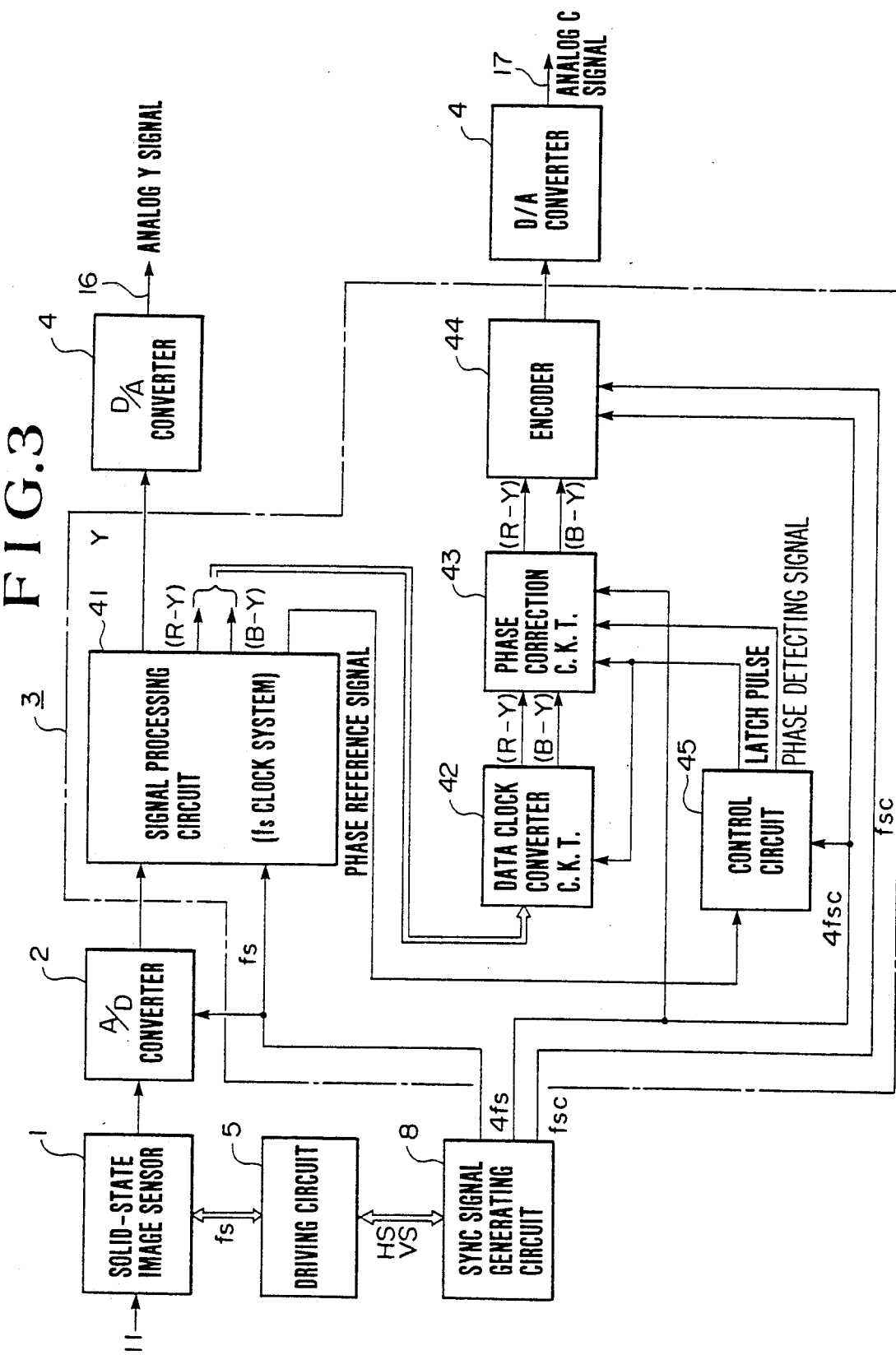
FIG. 3 is a block diagram of a video camera according to one embodiment of the present invention.

FIG. 3 shows the arrangement of the video camera according to one embodiment of the present invention. In FIG. 3, numeral 1 denotes a solid state camera element (sensor); numeral 2 denotes an A/D converter; numeral 3 denotes a digital signal processing circuit for generating a luminance signal and a color signal; numeral 5 denotes a driving circuit (sensor driving timing generating circuit); numeral 8 denotes a sync signal generating circuit; and numerals 4 and 4' denote a D/A converter, respectively. As described later, the digital signal processing circuit 3 is composed of a data clock converter circuit 42, a phase correction circuit 43, an encoder 44 and a control circuit 45.

First, the sync signal circuit 8 generates sync signals (a horizontal/vertical sync signals, a subcarrier, clocks, etc.) required for a signal processing circuit 41, the driving circuit 5 and other circuits. The pulses or the like necessary for the processings in the signal processing circuit 41, an encoder 44 are not shown in FIG. 3 since they are not essential to the present explanation. The driving circuit 5 reads signals from the solid-state image sensor 1 at the sensor clock cycle fs in synchronism with the horizontal sync signal and the vertical sync signal supplied from the sync signal generating circuit 8. The sensor output, which corresponds to an optical signal 11, is read from the solid-state image sensor 1, is supplied to the A/D converts 2. The A/D converter 2 converts the sensor output signal for each pixel into a digital signal in synchronism with the sensor clock; this digital signal is supplied to the signal processing circuit 41. The signal processing circuit 41 processes the digital sensor output signal after A/D conversion (which is supplied from the A/D converter 2 through the processing disclosed in Japanese Patent Publication No. 63-45153) on the basis of the sensor clock thereby to produce a luminance signal and color difference signals. The color difference signals (R−Y) and (B−Y) thus produced are supplied to the data clock converter circuit 42. The control circuit 45 detects, with accuracy of (8 fsc)$^{-1}$, a phase difference between the phase reference signal indicative of the changing point of the color difference signals supplied from the signal processing circuit 41 (e.g. a latch clock of the color difference signal as described above) and the 4 fsc clock supplied from the sync signal generating circuit to send a data latch pulse (clock) to the data clock converter circuit 42 and the phase correction circuit 43 and send a phase detecting signal to the phase correction circuit 43. The data clock converter circuit 42 latches the color difference signals (R−Y) and (B−Y) supplied from the control circuit 45 with the data latch clock so that the color difference signals after latch are sent to the phase correction circuit 43. The phase correction circuit 43 phase-corrects the color difference signals (R−Y) and (B−Y) to be sent to the encoder 44.

Meanwhile, the above control circuit 45 latches the supplied phase reference signal at the rising and falling edges of the 4 fsc clock to detect in which period of 'H' and 'L' of the 4 fsc clock the changing points of the color difference signals are located, on the basis of the latched two phase reference signals, and supplies the detected signal to the phase correction circuit 43. Now assuming that the 'H' period and the 'L' period are substantially equal, the changing points of the color difference signals can be detected at intervals of ½ of (4 fsc)$^{-1}$. Since (4 fsc)$^{-1}$/2=(8 fsc)$^{-1}$, the changing points can be detected with the accuracy of (8 fsc)$^{-1}$. Further, as mentioned above, the control circuit 45 processes the phase reference signal with the 4 fsc clock to generate the latch pulse which will be supplied to the data clock converter circuit 42. It should be noted that this latch pulse can provide a jitter up to (4 fsc)$^{-1}$ to the above phase reference signal in accordance with the phase relationship between the phase reference signal and the 4 fsc clock.

The data clock converter circuit 42 latches the color difference signals (R−Y) and (B−Y) supplied from the signal processing circuit 41 with the latch pulse supplied from the control circuit 45. As a result, the latched color difference signals (R−Y) and (B−Y) can be processed using the signal of the 4 fsc clock. However, as mentioned above, the latch pulse provides the jitter up to (4 fsc)$^{-1}$ so that the latched color difference signals also have the jitter up to (4 fsc)$^{-1}$. The latched color difference signals are further supplied to the phase correction circuit 5.

The phase correction circuit 43 first latches the color difference signals having the jitter up to (4 fsc)$^{-1}$ supplied from the data clock converter circuit 42 with the above latch pulse and adds these latched color difference signals to the signals before latch supplied from the data clock converter circuit 45 to generate the color difference signals having an intermediate phase. Next, in accordance with the phase detection signal sent from the control circuit 45, the color difference signals having the intermediate phase corresponding to one clock of (4 fsc)$^{-1}$ are selectively produced only if they are located, at the changing points, on the phase side in which the delay time of the color difference signals is shortened owing to latching by the data clock converter circuit 42 in the 'H' side or 'L' side of the 4 fsc clock; and in the other case, the color difference signals supplied from the data clock converter circuit 45 are produced.

Therefore, the signal advancing by (4 fsc)$^{-1}$ in the case where the maximum jitter is generated can be effectively delayed by ½ of (4 fsc)$^{-1}$ so that the maximum jitter is limited to (4 fsc)$^{-1}$/2=(8 fsc)$^{-1}$ which is permissible as mentioned above.

Figure 4:
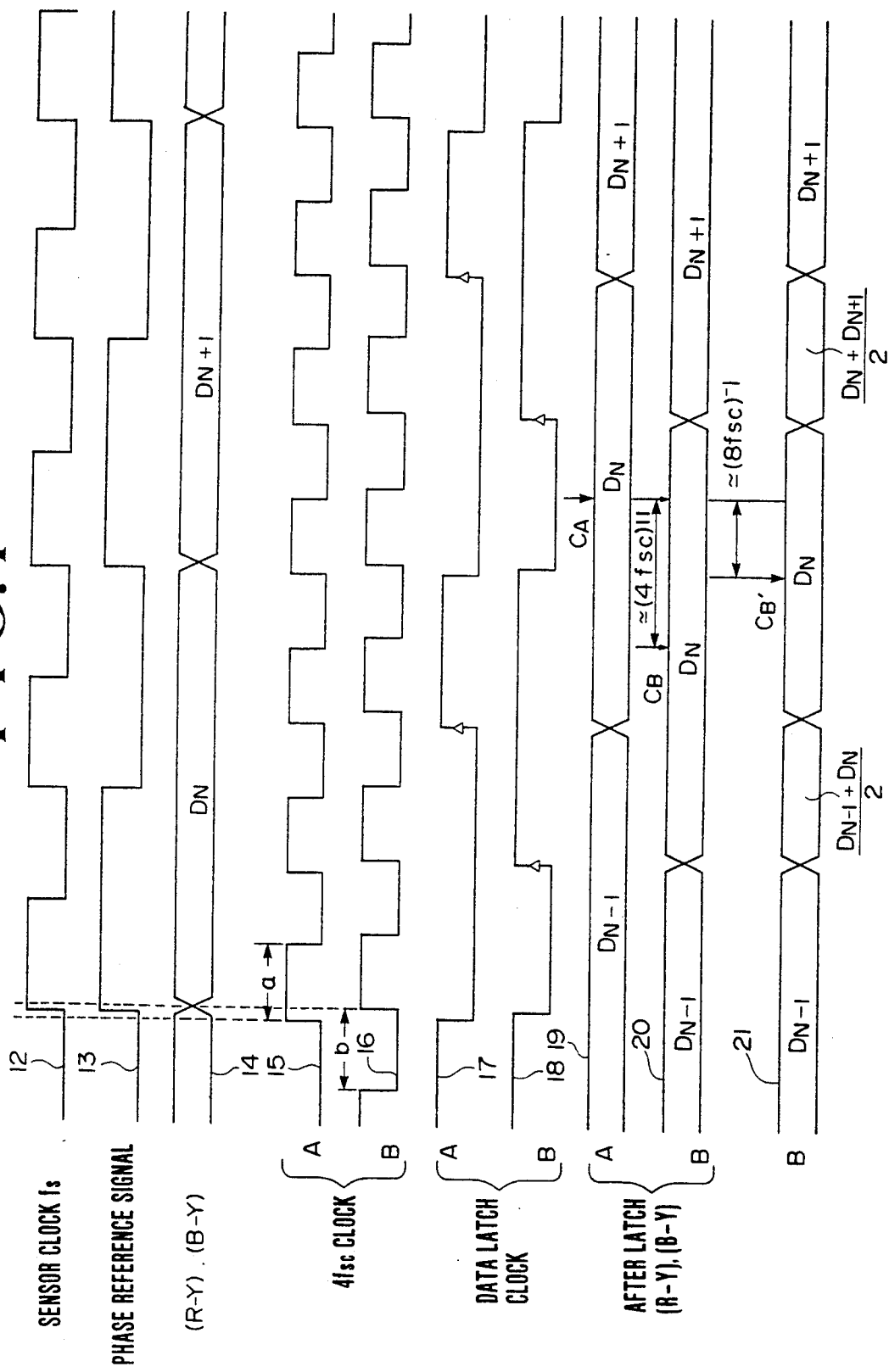
FIG. 4 is a timing chart showing the waveforms at the respective points of the arrangement of FIG. 3.

FIG. 4 shows the waveform charts for explicitly explaining the manner of reducing the jitter on the basis of the above processing. FIG. 4 shows the state where the maximum jitter is provided assuming that the sensor clock is fs ≃ (4 fsc)33 (2/3), the data cycle of the color difference signal is fs/2, the phase reference signal 13 has substantially the same phase as the 4 fsc clocks 15 and 16 (the phases A and B are slightly earlier and later from the phase reference signal 13, respectively).

In FIG. 4, a waveform 12 denotes a sensor clock fs; a waveform 13 denotes the phase reference signal; a waveform 14 denotes the color difference signals; the waveform 15 denotes the 4 fsc clock when its rising edge is in the phase (A phase) slightly earlier than that of the phase reference signal 13; the waveform 16 denotes the 4 fsc clock in the phase (B phase) slightly later than that of the phase reference signal 13; a waveform 17 denotes the data latch clock corresponding to the phase A; a waveform 18 denotes the data latch clock corresponding to the phase B; a waveform 19 denotes the color difference signals after latch corresponding to the phase A; a waveform 20 denotes the color difference signals after latch corresponding to the phase B; and a waveform 21 denotes the color difference signals phase-corrected corresponding to the phase B.

It should be noted that the data latch clocks 17 and 18 are generated by twice latching the phase reference signal with the rising edge of the 4 fsc clock. The reason for this is that generally, if the latched data and the latched clock are completely in phase with each other, the latched data may be unstable the malfunction due to this instability should be prevented. However, whether or not the jitter occurs owing to latching depends on the first latching. As mentioned above, the phase of the phase reference signal is decided according to which period of 'H' (a in FIG. 4) and 'L' (b in FIG. 4) of the 4 fsc clock its rising edge is located on. Under such an assumption, the data after latch advances by approximately $(4\ fsc)^{-1}$ in the phase B where the rising edge of the phase reference signal 13 is located in the 'L' period of the 4 fsc clock. Therefore, the control circuit 45 detects the phase B and the detected signal is supplied to the phase correction circuit 43. In accordance with the detected signal, the phase correction circuit executes the phase correction only at the phase B to produce the color difference signals after phase correction as shown by the waveform 21. At the phase B, the color difference signals as shown by the waveform 19 are used as they are. As apparent from the comparison of the waveform 19 with the waveform 20, the above processing provides the jitter of $(8\ fsc)^{-1}$ corresponding to the phase difference between the center points ($C_A$ and $C_B'$ in FIG. 4) of N-th data which is substantially half as long as that between the center points ($C_A$ and $C_B$ in FIG. 4) of the N-th data in the case where the phase correction is not made. In short, the above processing can reduce the jitter up to $(4\ fsc)^{-1}$ to $(8\ fsc)^{-1}$.

In this way, when the sensor having any number of pixels is used, the jitter attendant on the data clock conversion of the color difference signals (R−Y) and (B−Y) to be supplied to the encoder 44 can be limited to $(8\ fsc)^{-1}$ or less The encoder 44 balance-modulates the supplied color difference signals (R−Y) and (B−Y) using the 4 fsc clock and fsc clock supplied from the sync signal generating circuit 8.

The modulated color signal generated through the above processing and the luminance signal produced by the signal processing circuit 41 are sent to D/A converter circuits 4' and 4, respectively. The D/A converters circuits 4 and 4' convert the supplied luminance signal and modulated color signal into corresponding analog signals, respectively. These D/A converter circuits 4 and 4' are not required if the above luminance signal and modulated color signal are processed hereafter as they are digital signals.

In accordance with this embodiment, the signal processing including an encoder can be digitized, and when the sensor having any number of pixels is used, the jitter generated in the encoder can be limited to $(8\ fsc)^{-1}$, thus preventing the image quality from changing.

Figure 5:
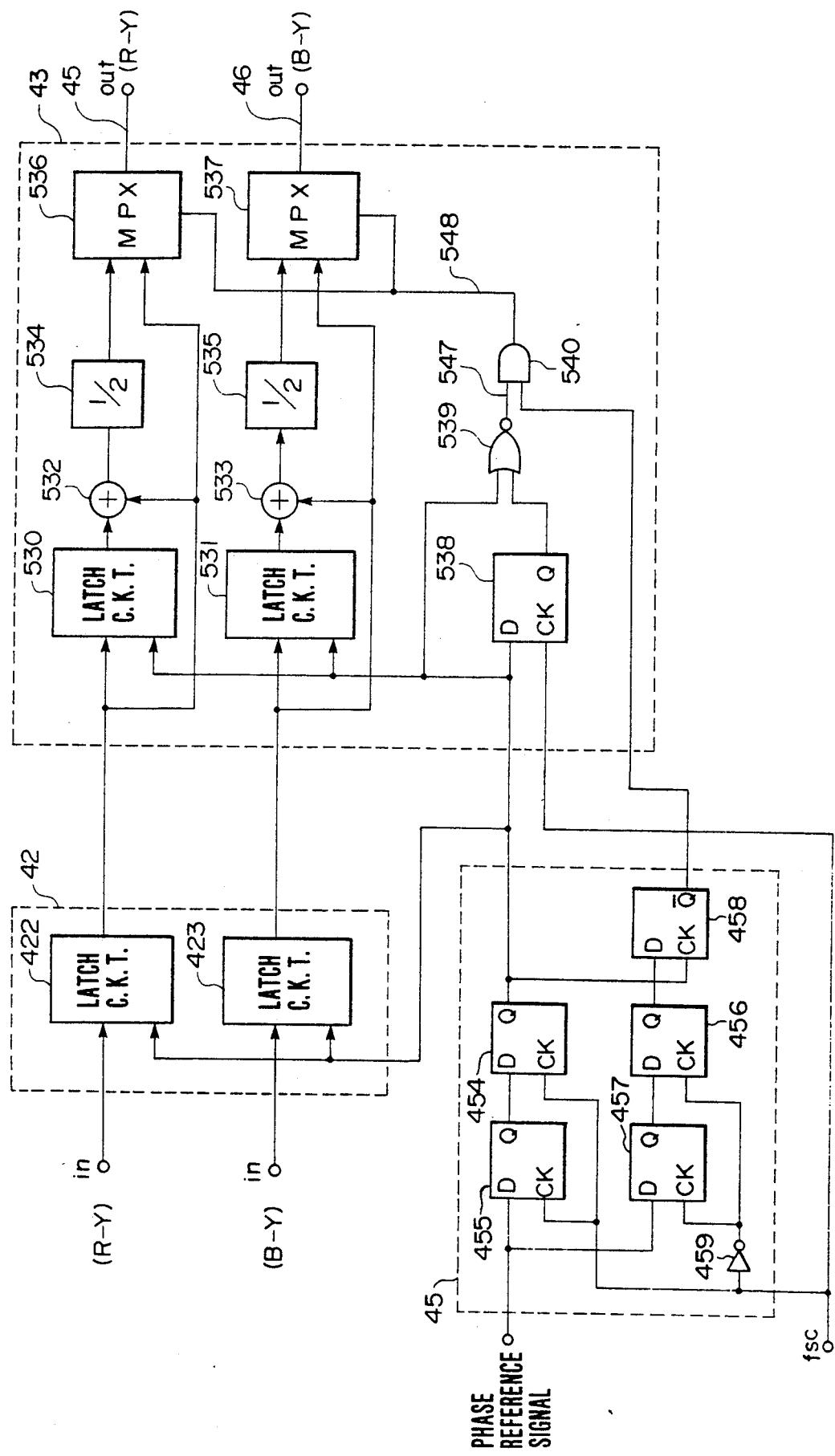
FIG. 5 is a block diagram showing the details of the data clock converter circuit, the phase correction circuit and the control circuit in FIG. 3.
Figure 6:
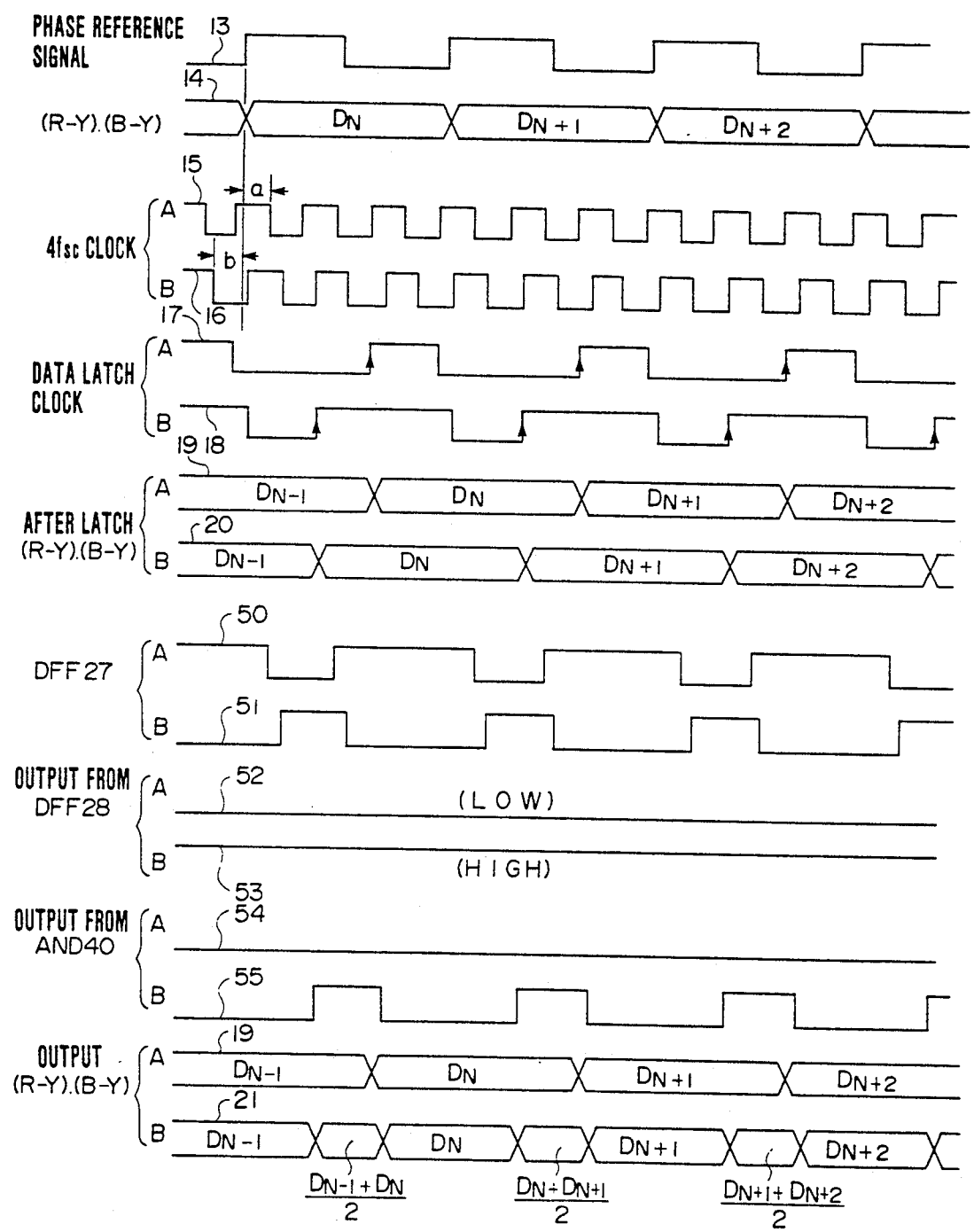
FIG. 6 is a timing chart showing the waveforms at the respective points in FIG. 5.

FIG. 5 shows the respective details of the data clock converter circuit 42, the phase correction circuit 53 and the control circuit 45. FIG. 6 shows the waveforms at the respective points in FIG. 5. As described in connection with FIG. 4, in FIG. 6 also, assuming that the sensor clock is fs ⅔ (4 fsc)×(2/3), and the phase reference signal and the edge of the 4 fsc clock are substantially in phase with each other, the state providing the maximum amount of jitter is taken. Further, it is also assumed that the data cycle of the color difference signals (R−Y) and (B−Y) is ½ of the sensor clock as in the previous case.

In FIG. 5, the data clock converter circuit 42 is composed of latch circuits 422 and 423; the phase correction circuit is composed of latch circuits 530, 531, adder circuits 532, 533, coefficient circuits 534, 535, multiplexers 536, 537, a DFF (D flip-flop) 538, a NOR gate 539 and an AND gate 540; and the control circuit 45 is composed of DFF's 454, 455, 456, 457 and 458 and an inverter 459. Further, in FIG. 6, the same reference numerals refer to the same waveforms in FIG. 4. Namely, the waveform 13 denotes a phase reference signal; the waveform 14 denotes a data train Di resulting from the sum of i-th (R−Y) and (B−Y); the waveform 15 denotes the 4 fsc clock having the phase (A phase) that is slightly earlier than the rising edge of the phase reference signal; and the waveform 16 denotes the 4 fsc clock having the phase (B phase) that is slightly later than the phase reference signal 13. The other waveforms correspond to like waveforms in FIG. 4.

An explanation will be given of still remaining waveforms in connection with the operations of the corresponding components. First, the phase reference signal 13 and the 4 fsc clock are supplied to the control circuit 45. The control circuit 45 latches the supplied phase reference signal (waveform 13) twice at the rising edge of the 4 fsc clock by DFF's 454 and 455 and twice at the falling edge of the 4 fsc clock by DFF's 456 and 457. As a result, the respective Q outputs of DFF 454 and 456 provide pairs of waveforms 17 (phase A) and 18 (phase B), and 50 (phase A) and 51 (phase B). The Q output from the DFF 454 is supplied to the data clock converter circuit 42 and the phase correction circuit 53 as a data latch clock. On the other hand, the Q output from DFF 456 is further latched by DFF 458 with the Q output from DFF 454. Thus, the Q output from DFF 458 provides the waveform 52 in the phase A and the waveform 53 in the phase B. Therefore, according as the Q output from DFF 458 is 'L' or 'H', it is possible to detect in which period of the 'H' (a in FIG. 6) and 'L' (b in FIG. 6) periods of the 4 fsc clock the rising edge of the phase reference signal 13 is located. This operation corresponds to the phase detection described previously. The Q output from DFF 458 is supplied to the phase correction circuit 53 as a phase detection signal.

The data clock converter circuit 42 latches the color difference signals (R−Y) and (B−Y) indicated by numeral 14 by the latch circuits 422 and 423 with the data latch clock supplied from the control circuit 45. Each of the latch circuits 422 and 423 may be composed of DFF's corresponding to the number of bits of the color difference signals (R−Y) and (B−Y). The respective outputs of the latch circuits 422 and 423 provide the waveform (phase A) or the waveform (phase B). These output signals are supplied to the phase correction circuit 43.

The phase correction circuit 53 latches the color difference signals (R−Y) and (B−Y) supplied from the data clock converter circuit 42 by the latch circuits 530 and 531 with the data latch clock supplied from the control circuit 45. The color difference signals (R−Y) and (B−Y) after latch are added to the color difference signals before latch supplied from the data clock converter circuit 42. The signals thus obtained are multiplied by the coefficient circuits 534 and 535 to provide the color difference signals $(D_i + D_{i+1})/2$ in the intermediate phase between $D_i$ and $D_{i+1}$ which are supplied to the multiplexers 536 and 537.

The multiplexers 536 and 537 produce the supplied color difference signals in the intermediate phase and the color difference signals supplied from the data clock inverter circuit 42 in accordance with the output signal from the AND gate 540. Now it is assumed that if the output form the AND gate 540 is 'H', the color difference signals in the intermediate phase are produced. On the other hand, the rising edge detecting circuit composed of DFF 538 and NOR gate 539 produces an edge signal which is 'H' during only one cycle of the 4 fsc clock immediately after the supplied data latch clock has changed from 'L' to 'H'. The AND gate 540, in accordance with the phase detection signal supplied from the control circuit 45, supplies the above edge signal to the multiplexers 536 and 537 for the phase B and mask this signal for the phase A. The waveform of the output from the AND gate 540 is shown as the waveforms 54 (phase A) and 55 (phase B) in FIG. 6. As a result, the multiplexers 36 and 37 selectively produce the color difference signals in the intermediate phase only at the edge of the phase B, and produce the color difference signals having the waveform 19 for the phase A and those having the waveform 21 for the phase B. These color difference signals are those with the jitter suppressed.

Figure 7:
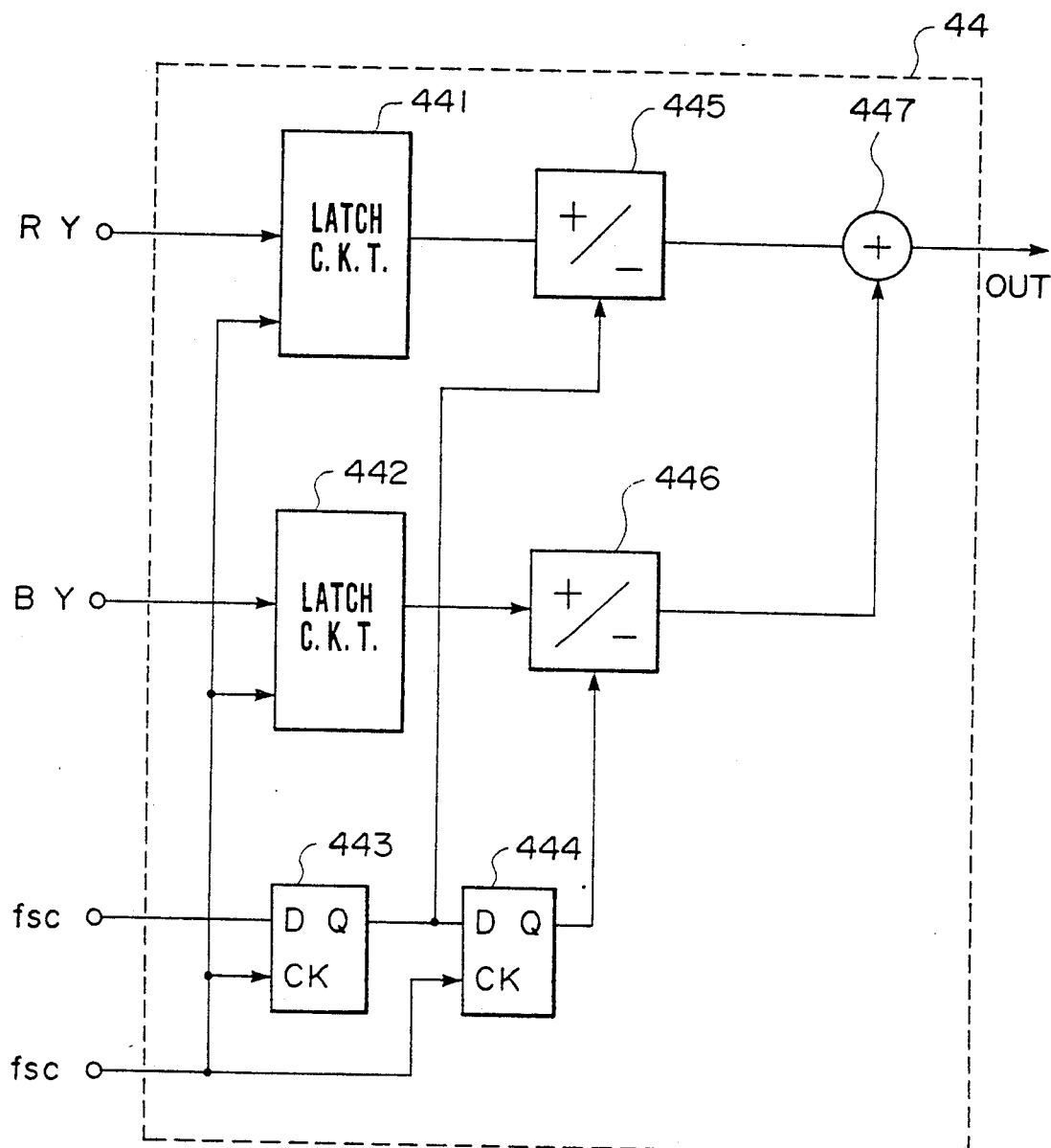
FIG. 7 is a block diagram showing the details of the digital encoder in FIG. 3.
Figure 8:
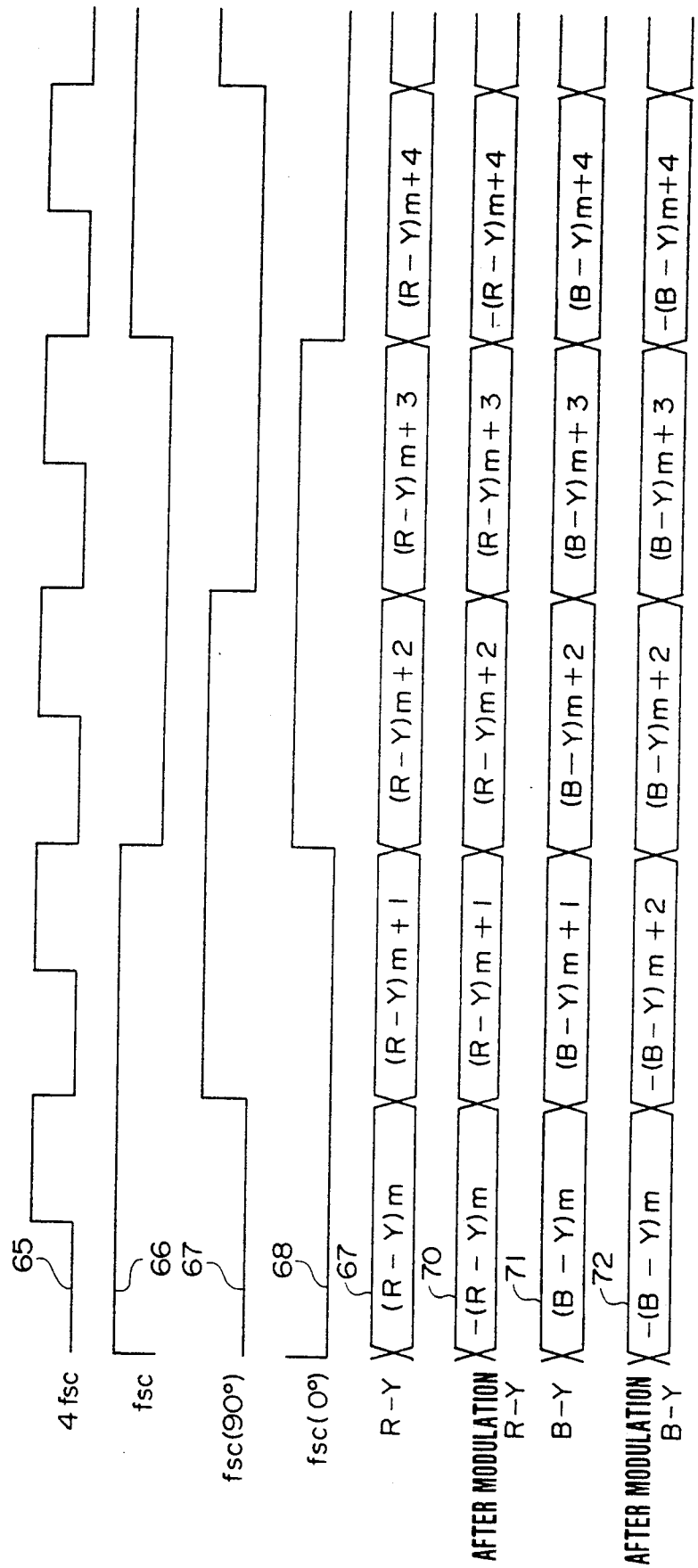
FIG. 8 is a timing chart showing the waveforms at the respective points in FIG. 7.

FIG. 7 shows the details of the digital encoder 44 in an NTSC system in FIG. 3. The digital encoder 44 is composed of latch circuits 441, 442, polarity inverter circuits 445, 446, DFF's 443, 444, and an adder 447. With reference to FIG. 8, the operation of the digital encoder 44 will be explained below. First, the color subcarrier fsc having the waveform 66 supplied from the sync signal generating circuit 8 (FIG. 3) is latched by the DFF 433 with the 4 fsc clock having the waveform 65. Thus, a signal having the waveform 67 is obtained. Further, this signal is latched by DFF 444 to provide a signal having the waveform. The signals having the waveforms 67 and 68 thus obtained are color subcarrier signals having a phase difference of 90° from each other, which are supplied to the polarity inverter circuits 445 and 446. The polarity inverter circuits 445 and 446, if the signals from DFF's 443 and 444 are 'L', invert the polarities of the color difference signals (waveforms 69 and 70) which have been obtained by latching the color difference signals with the jitter suppressed by the phase correction circuit with the 4 fsc clock, thus producing signals having waveforms 70 and 71. These signals having the waveforms 70 and 71, which are the signals modulated by the subcarriers out of phase by 90° from each other, are added by an adder circuit 447 to provide a color signal subjected to quadrature balanced modulation. Although the explanation hitherto made relates to the case of NTSC system, in the case of PAL system also, the quadrature balanced modulation can be implemented in the same construction in such a manner that a line ID is input to the polarity inverter circuit 445 and the polarity inversion is done for each line when the subcarrier is 'H' or 'L'

Figure 9:
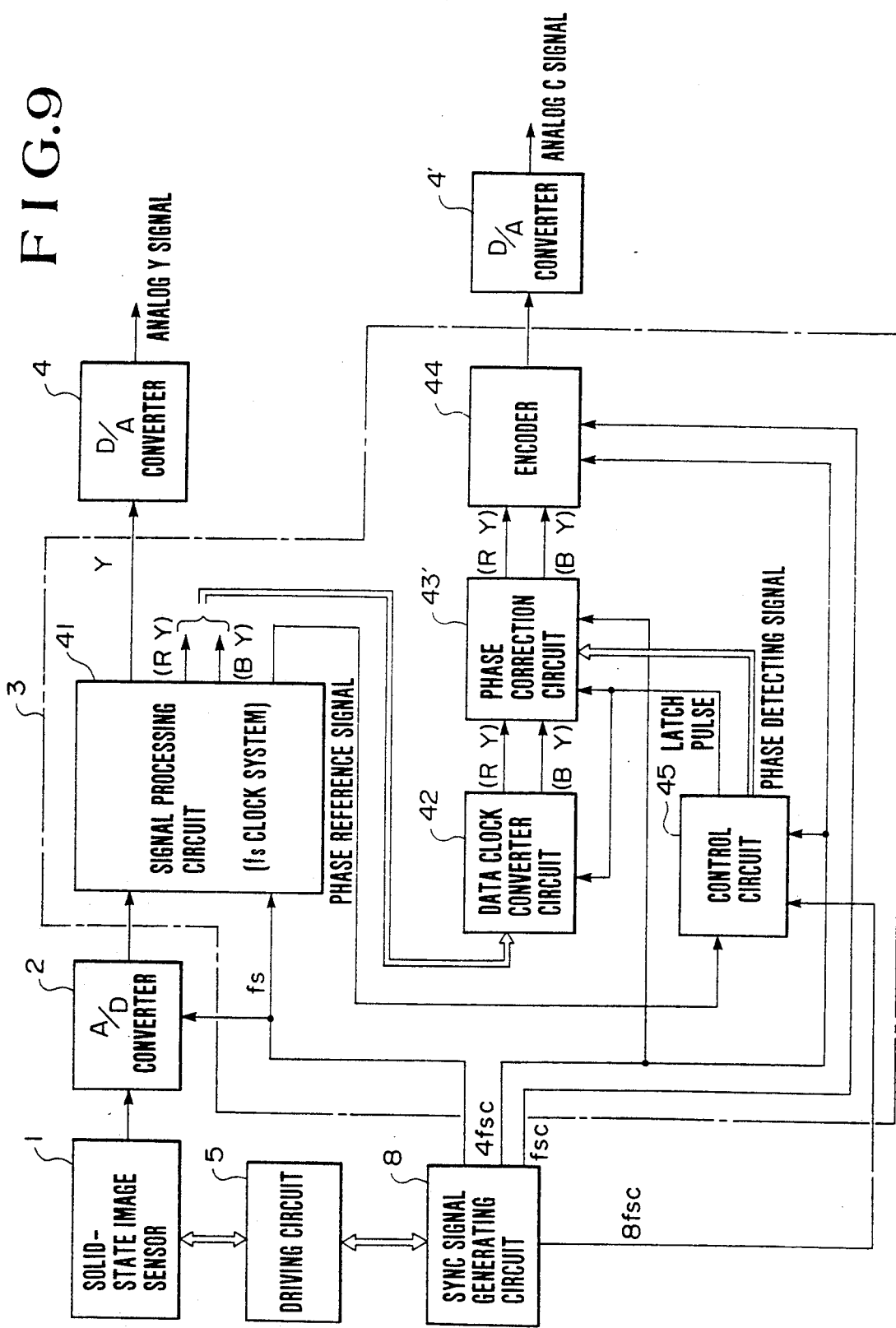
FIG. 9 is a block diagram of a modification of the arrangement of FIG. 3.
Figure 10:
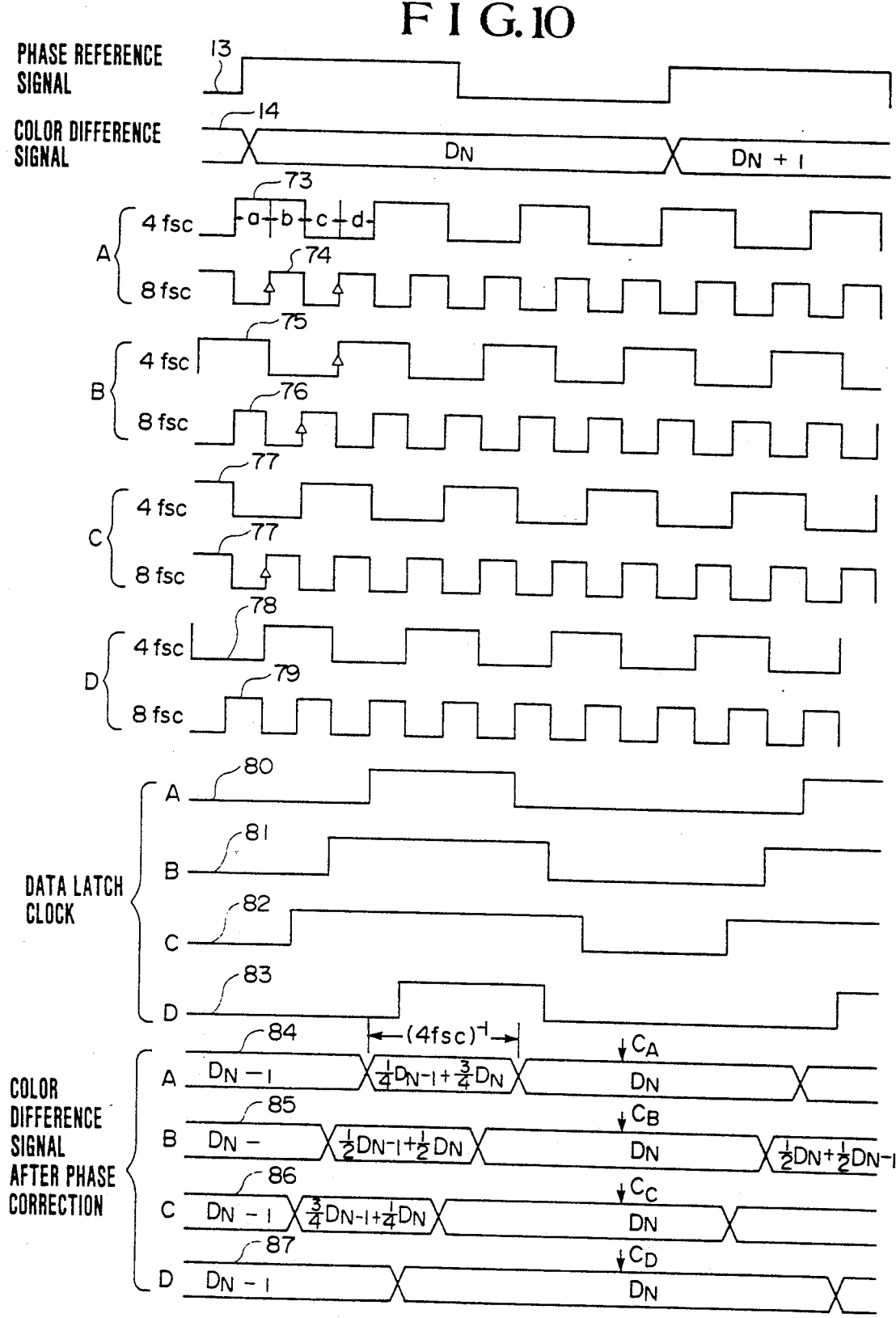
FIG. 10 is a timing chart showing the respective points in FIG. 9.

FIG. 9 shows another embodiment of the present invention. In FIG. 9, like reference numerals designate like components in the previous embodiment. The present embodiment uses both 8 fsc clock and 4 fsc clock to detect the changing points of the color difference signals with the accuracy of $(16 \text{ fsc})^{-1}$ for phase correction. As a result, the jitter generated results in $(16 \text{ fsc})^{-1}$. The maximum frequency of the clock is twice as large as in the embodiment of FIG. 3 and so the power consumption of the oscillator is increased. But the data processing is performed using the clock up to 4 fsc so that the power consumption in the data processing is substantially equal to that in the previous embodiment. The embodiment shown in FIG. 9 is basically different from the previous embodiment in only its phase correction circuit 43' so that only the phase correction circuit 43' will be explained below referring to FIG. 10.

First, the control circuit 45' divides one cycle of the 4 fsc clock into four parts to detect in which range the changing points of the color difference signals (rising phase of the phase reference signal) are changed. The phase ranges divided into four parts are designated by a, b, c and d in FIG. 10. The cases where the rising edges of the phase reference signal are located in a, b, c and d are referred to as phases A, B, C and D, respectively. Waveforms 72 and 73, waveforms 74 and 75, waveforms 76 and 77 and waveforms 78 and 79 are the 4 fsc clock and the 8 fsc clock in the cases of phases A, B, C and D, respectively. Further, waveforms 80, 81, 82 and 83 are data latch clocks, corresponding to the respective phases, produced by latching the phase reference signal 13 with the rising edge of the 8 fsc clock and thereafter with that of the 4 fsc clock. With respect to these data latch clocks, the phase A, the phase B and the phase C are earlier than the phase D by $(16 \text{ fsc})^{-1}$, $2(16 \text{ fsc})^{-1}$ and $3(16 \text{ fsc})^{-1}$, respectively. Therefore, the color difference signals latched by the data clock converter circuit 42 with these data latch clocks have the above phase differences corresponding to the respective phases. The phase correction circuit 43 creates, on the basis of the color difference signal $(D_{i-1}, D_i)$, the signals having intermediate phases $(\frac{3}{4}D_{i-1}+\frac{1}{4}D_i)$, $(\frac{1}{2}D_{i-1}+\frac{1}{2}D_i)$ and $(\frac{1}{4}D_{i-1}+\frac{3}{4}D_i)$ and outputs these signals having the intermediate phases corresponding to the phases A, B and C during only one cycle of the 4 fsc clock at the changing points of the color difference signal, thus providing waveforms 84, 85, 86 and 87 the center points of which are out of phase from one another as designated by $C_A$, $C_B$, $C_C$ and $C_D$. In short, in accordance with this embodiment, in which the data processing is performed using the 4 fsc clock, the jitter can be corrected with high accuracy of $(16 \text{ fsc})^{-1}$.

Now referring to FIG. 11 et seq., other embodiments of the present invention will be explained below.

Figure 11:
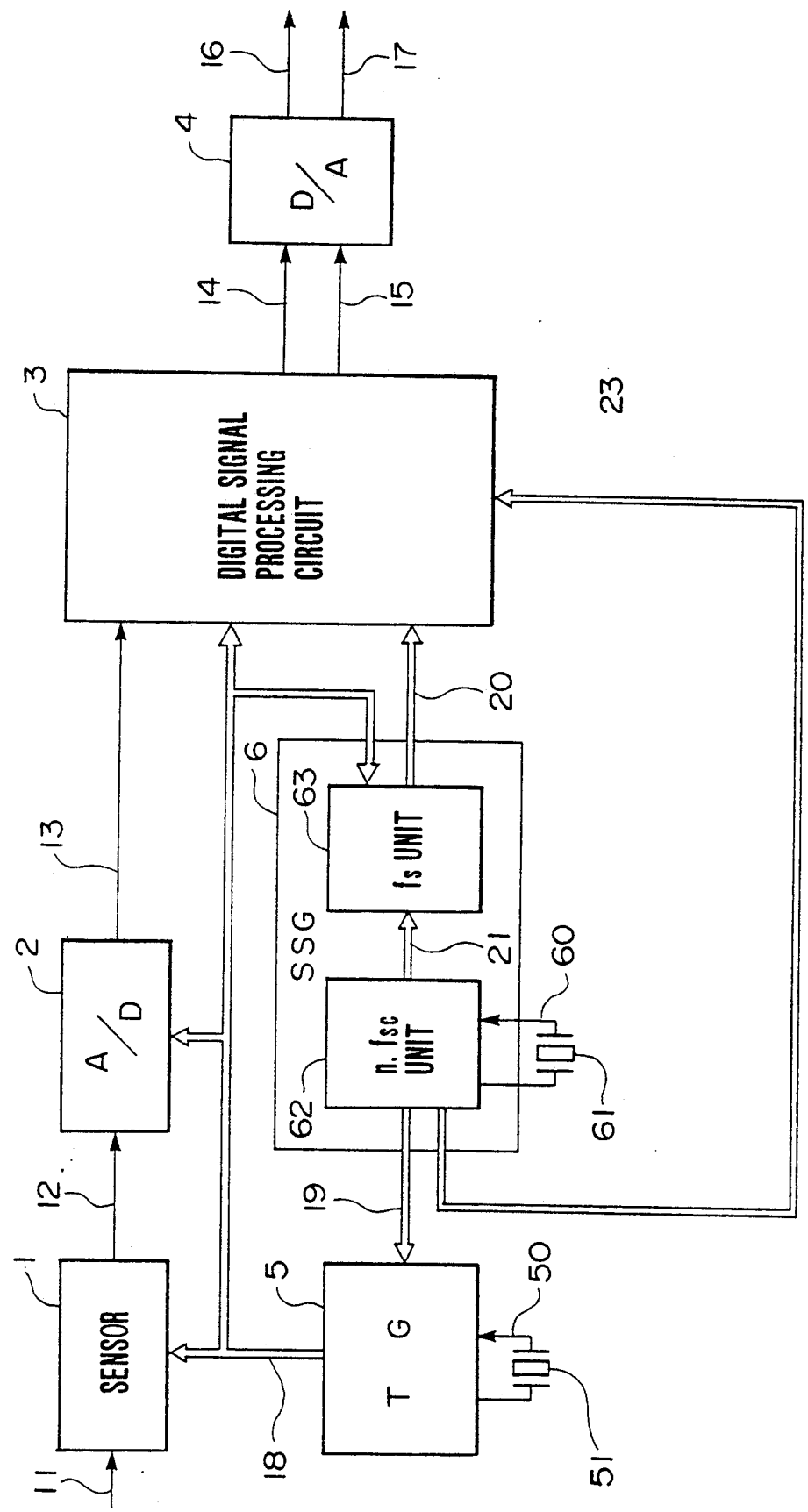
FIG. 11 is a block diagram of the video camera according to another embodiment of the present invention.

The video camera system according to the embodiment of FIG. 11 is composed of a sensor 1, an analog/digital converter circuit (A/D) 2, a digital signal processing circuit 3, a digital/analog circuit (D/A) 4, a sensor driving timing generating circuit (TG) 5, an oscillation circuit 51, a sync signal generating circuit (SSG) 6 and an oscillation circuit 61. In FIG. 11, like reference numerals designate like components in FIG. 3.

The operation of the video camera system having the above arrangement will be explained below. The sensor 1, when having received an optical signal 11, produces for each one horizontal scanning period an analog pixel signal 12 composed of repeated color signals which are synchronous with the sensor clock at the frequency of fs and are alternately different. The operation of the sensor 1 is controlled by the control signal 18 from the TG 5. The A/D 2, when it receives the analog pixel signal from the sensor 1, converts it into a digital pixel signal 13 which is in turn supplied to the digital signal processing circuit 3. The digital signal processing circuit 3, when it receives the digital pixel signal 13 from the A/D 2, the control signal 18 from the TG 5, and the sync signal 20 and control signal 23 from SSG 6, produces a luminance signal 14 and a color signal 15 supplemented with the sync signal, respectively, which are supplied to the D/A 4. The D/A 4, when it receives the luminance signal 14 and the color signal 15 supplemented with the sync signal, converts these two signals 14 and 15 into analog signals to produces a luminance signal 16 and a color signal 17 supplemented with the analog sync signal, respectively. Additionally, the SSG 6 creates the sync signal 20 on the basis of the control signal 18. And, the TG 5 creates the control signal 18 on the basis of the control signal 19 sent from the SSG 6 and the reference signal 50 sent from the oscillation circuit 51.

Figure 12:
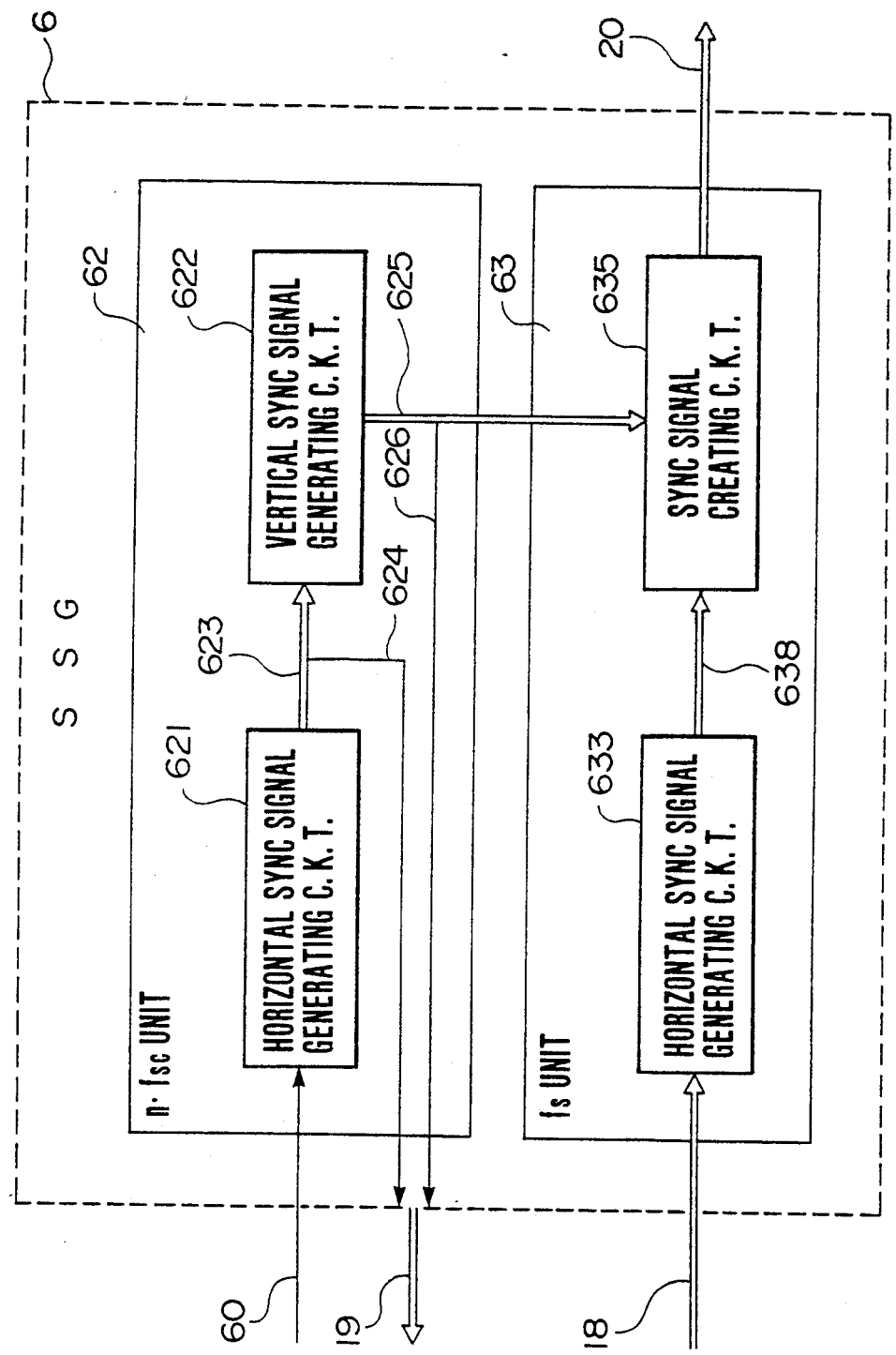
FIG. 12 is a block diagram showing the details of the sync signal generating circuit in FIG. 11.

FIG. 12 shows a concrete arrangement of the SSG 6. In FIG. 12, the SSG 6 is composed of an n fsc unit 63 and a fs unit 63. Further, the n fsc unit 62 is composed of a horizontal sync signal generating circuit 621 and a vertical sync signal generating circuit 622, and the fs unit is composed of a horizontal sync signal generating circuit 633 and a sync signal creating circuit 635. The operation of the SSG 6 will be explained below.

First, when the n fsc unit 62 receives the signal 60 at the frequency of n fsc from the oscillation circuit 61, the horizontal sync signal generating circuit 621 generates a horizontal sync signal 623 which is sent to the vertical sync signal generating circuit 622. The vertical sync signal generating circuit 622, when it receives the horizontal sync signal 623 from the horizontal sync signal generating circuit 621, generates a vertical sync signal 625 which is supplied to the sync signal creating unit 635 in the fs unit 63. Further, the n fsc unit 62 sends to the TG 5, as the control signals 19, the signal (CHD) 624 for creating the signal horizontally driving the sensor 1 in the horizontal sync signal 623 and the signal (VD) 626 for creating the signal vertically driving the sensor 1 in the vertical sync signal 625. The TG 5, which receives the control signals 19 from the SSG 6, takes the phase lock of the signal obtained by frequency-dividing the reference signal 50 supplied from the oscillation circuit 50 with the CHD 624 and creates the control signals such as the sensor clock at the frequency of fs from the above reference signal 50; the control signals 18 are sent to the fs unit 63 in the SSG 6. The horizontal sync signal generating circuit 633, when it receives the control signals 18, generates a horizontal sync signal 638 synchronous with the sensor clock fs which is supplied to the sync signal creating circuit 635. The sync signal creating circuit 635, when it receives the vertical sync signal 625 from the vertical sync signal generating circuit 622, and the horizontal sync signal 638 from the horizontal sync signal generating circuit 633, creates sync signals (CSYNC, CBLK, BF) 20 which are supplied to the digital signal processing circuit 3. It should be noted that the horizontal sync signal 638 and the vertical sync signal 625 are synchronous with the sensor clock fs so that the sync signals are also synchronous with the sensor clock fs.

Figure 13:
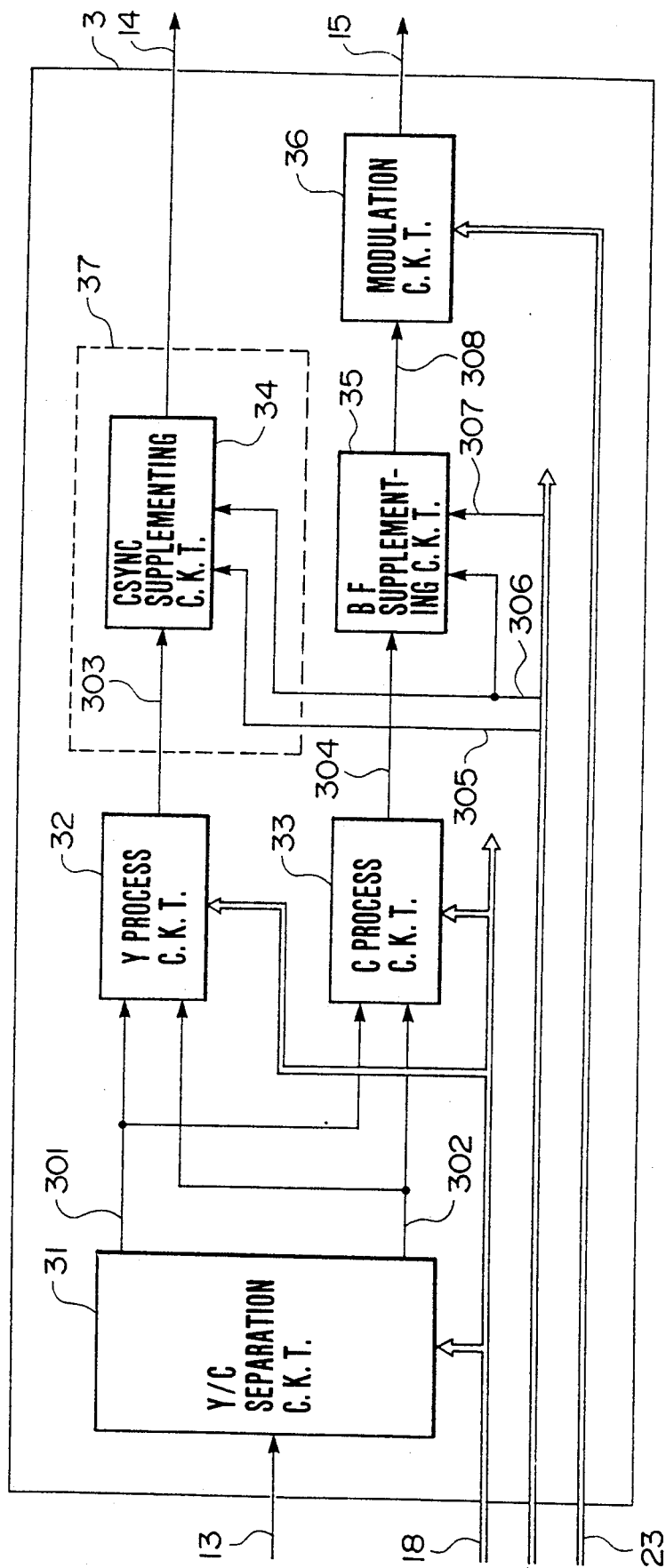
FIG. 13 is a block diagram showing the details of the digital signal processing circuit.

FIG. 13 shows a concrete arrangement of the digital signal processing circuit 3. The digital signal processing circuit 13 is composed of a Y/C separation circuit 31, a Y process circuit 32, a C process circuit and a CSYNC supplementing circuit 34, a BF supplementing circuit 35 and a modulation circuit 36. The operation of the digital signal processing circuit 3 will be explained below.

First, the Y/C separation circuit 31, when it receives the digital pixel signal 13 from the A/D 2, creates the first pixel signal 301 which is a luminance signal obtained by extracting the luminance component from the output signal from the A/D 2, and the second pixel signal 302 which is a color signal also extracted from the output signal from the A/D 2; these two signals are supplied to the Y process circuit 32 and the C process circuit 33, respectively. The Y process circuit 32, when it receives the first pixel signal 301 and the second pixel signal 302 from the Y/C separation circuit 31, creates a luminance signal 313 to be supplied to the CSYNC supplementing circuit 34. On the other hand, the C process circuit 33, when it receives the first pixel signal 301 and the second pixel signal 302 from the Y/C separation circuit 31, creates color difference signals 304 to be supplied to the BF supplementing circuit 35. Additionally, the Y/C separation circuit 31, the Y process circuit 32 and the C process circuit 33, which are controlled by the control signals 18 supplied from the TG 5, are phased-locked with the sensor clock fs. Therefore, the luminance signal 303 and the color difference signals 304 are also synchronous with the sensor clock fs, respectively. The sync signals supplied from the SSG 6 include three signals of CSYNC 305, CBLK 306 and BF 307. The CSYNC supplementing circuit 34, when it receives the luminance signal 303 from the Y process circuit 32, and CSYNC 305 and CBLK 306 from the SSG 6, creates the luminance signal 14 supplemented with the sync signals 20. On the other hand, the BF supplementing circuit 35, when it receives the color difference signals 304 from the C process circuit 33, and BF 305 and CBLK 306 from the SSG 6, creates the color difference signals 308 supplemented with the sync signals; the color difference signals are supplied to the modulation circuit 36. The modulation circuit 36, when it receives the color difference signal supplemented with the sync signals from the BF supplementing circuit 35 and the control signal 23 from the SSG 6, outputs the color signal 15 supplemented with the sync signals. Thereafter, the D/A 4 converts the luminance signal 14 and the color signal 15 supplemented with the sync signals into the analog luminance signal 16 and the analog color signal 17, respectively.

In accordance with the embodiment shown in FIGS. 11 to 13, the signal processing is controlled by the sensor clock and the sync signals are also created on the basis of the sensor clock so that the digital luminance signal is made synchronous with the sync signals; thus, it is possible to prevent the jitter from being generated in synthesizing the above two signals.

Now referring to FIGS. 14 to 17, a modification of this embodiment will be explained below. The basic arrangement of video camera system according to this modification is substantially the same as that shown in FIG. 11, but is different from the latter in that the SSG 6 is replaced by a programmable SSG 65, and a microcomputer 7 for controlling it is provided.

Figure 14:
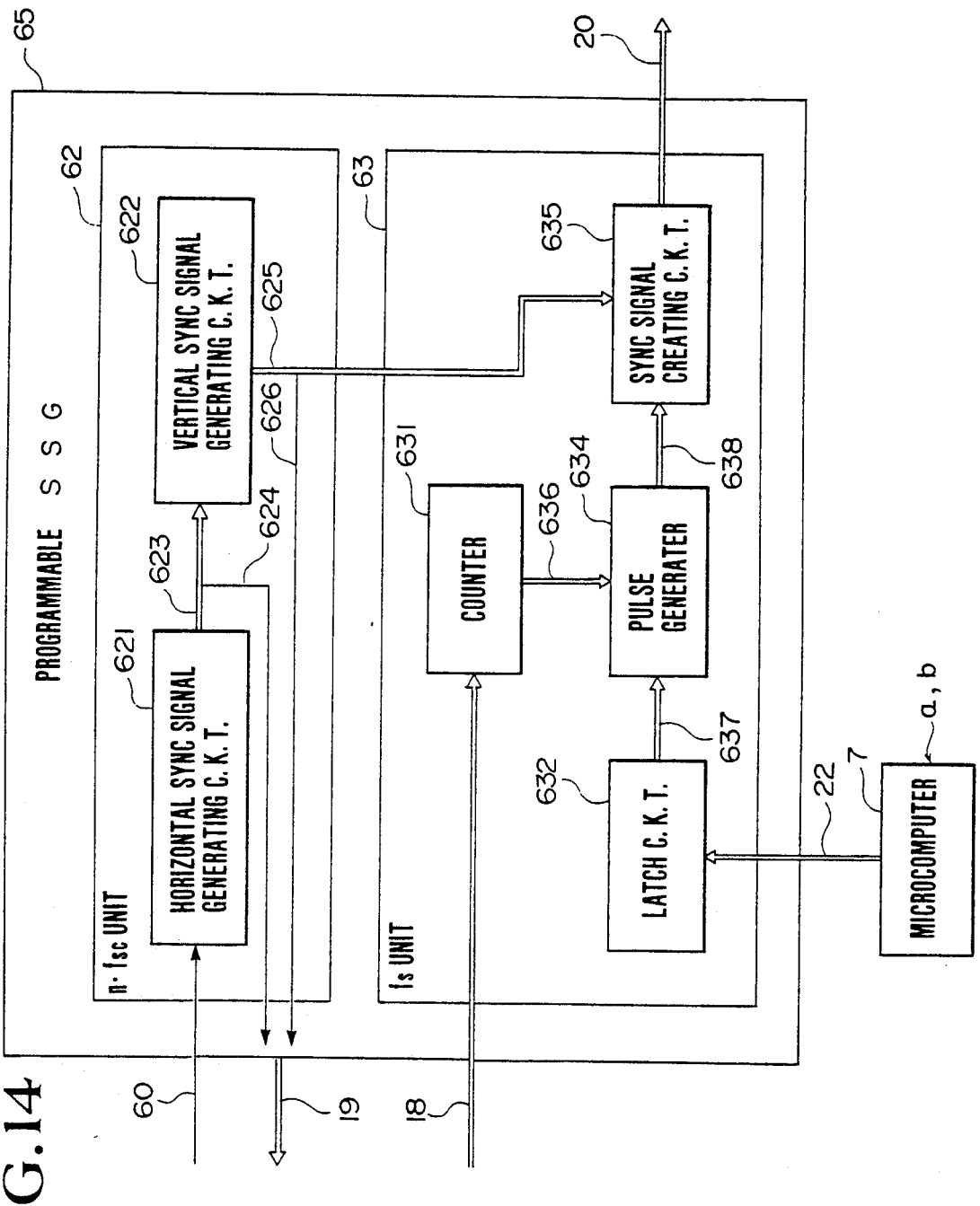
FIG. 14 is a block diagram showing the details of the programmable sync signal generating circuit in FIG. 11.
Figure 15:
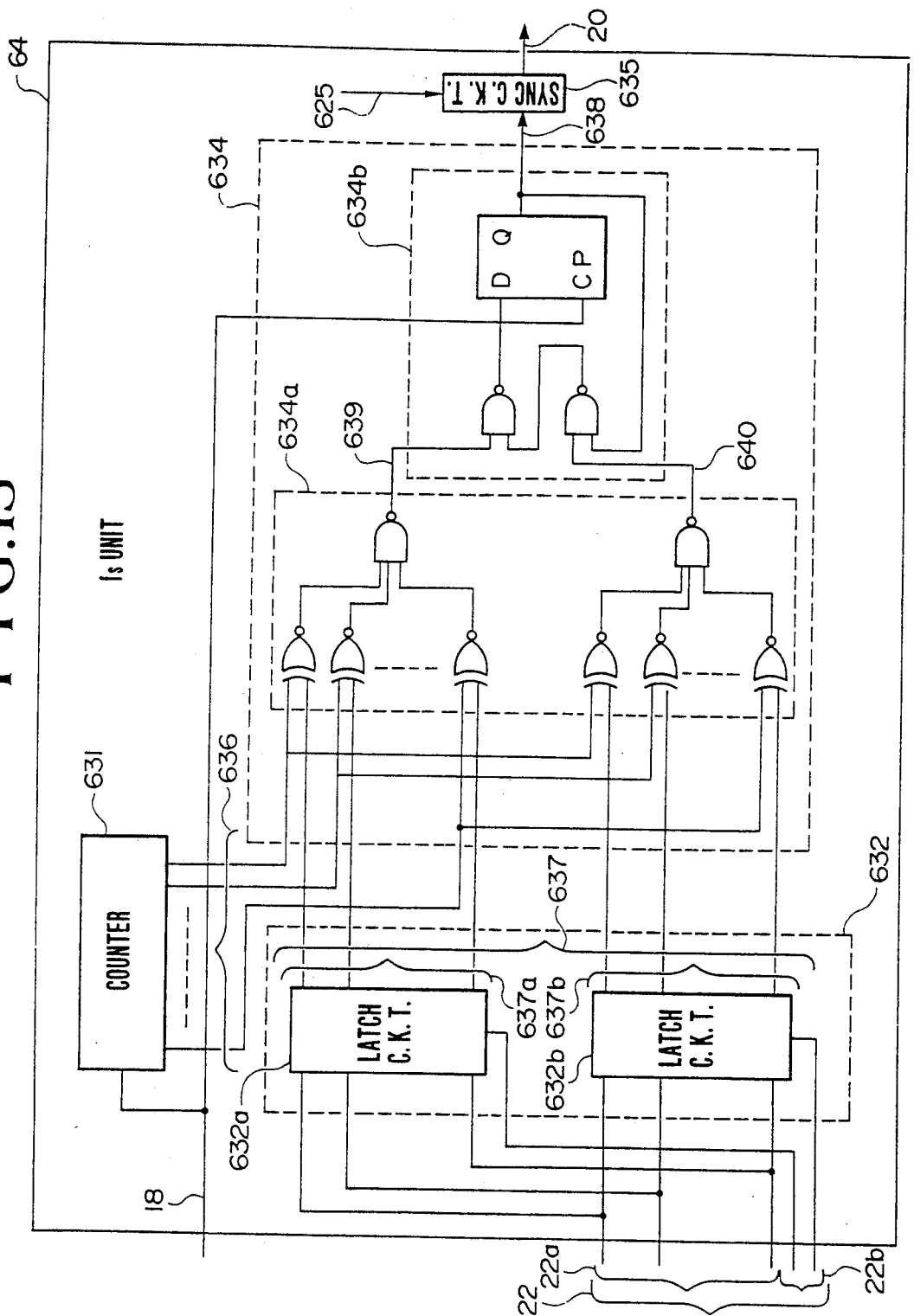
FIG. 15 is a modification of the embodiment of FIG. 11.
Figure 16:
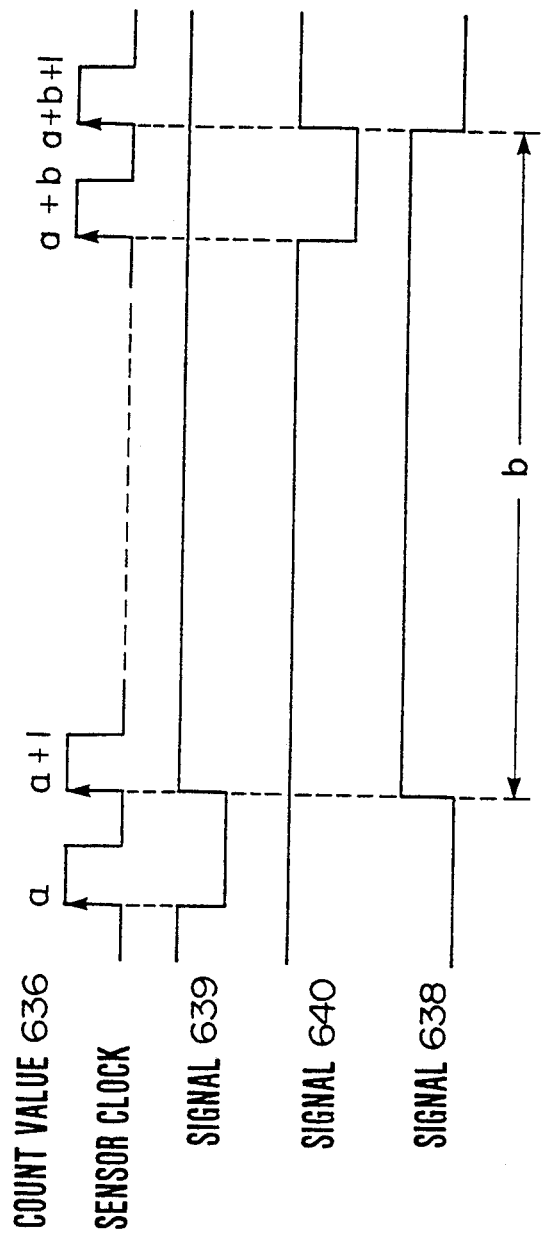
FIG. 16 is a timing chart of the sync signals in FIG. 15.
Figure 17:
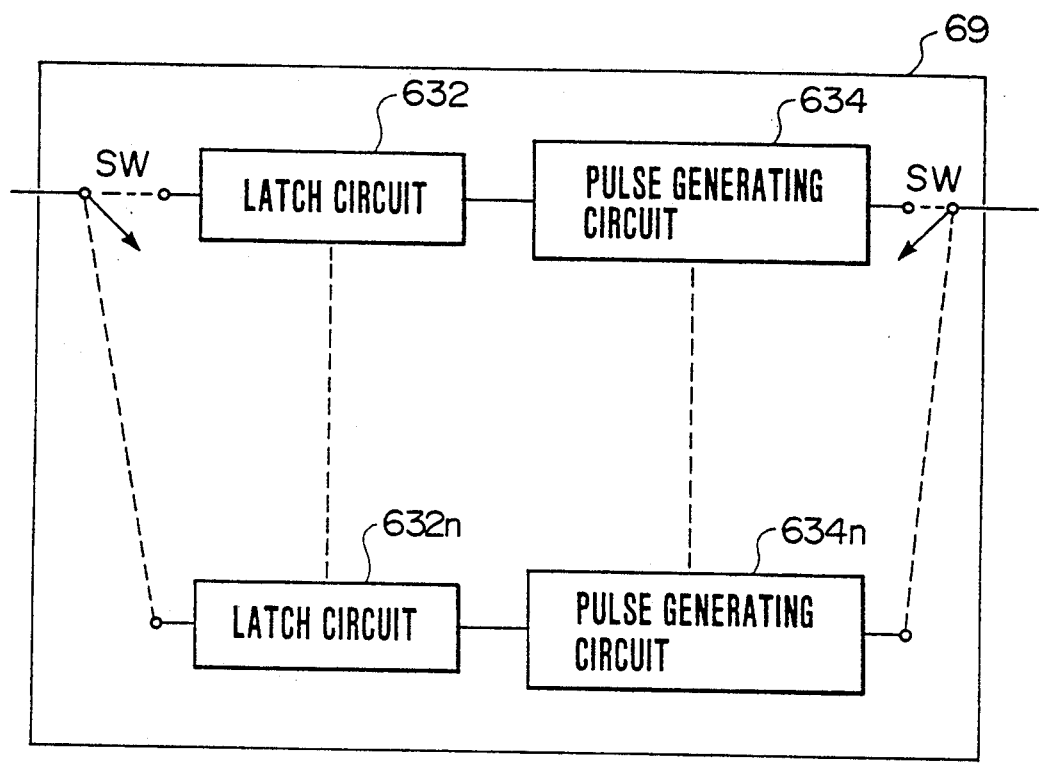
FIG. 17 is a block diagram of a modification of each of the latch circuit and the horizontal sync circuit in FIG. 15.
Figure 22:
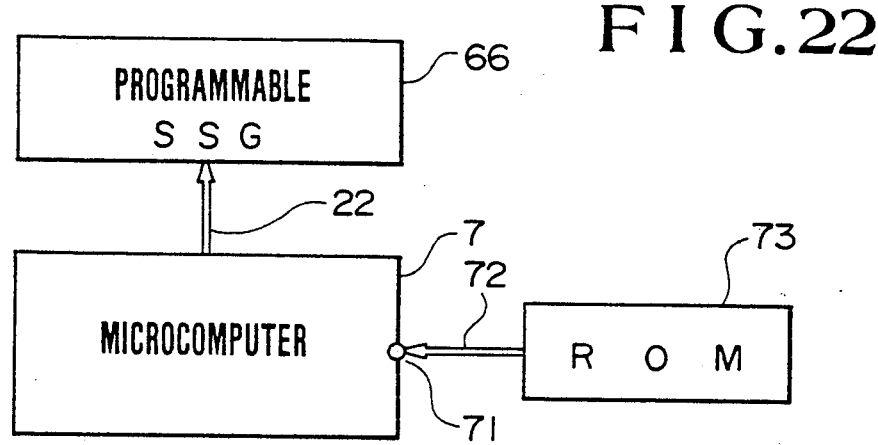
FIGS. 22 to 24 are schematic block diagrams of the video cameras according to further embodiments of the present invention.

FIG. 14 shows a concrete arrangement of the programmable SSG 65 and the microcomputer 7. In FIG. 14, the SSG 65 is composed of an n fsc unit 62 and a fs unit 64; the fs unit is composed of a counter 631, a latch circuit 632, a horizontal sync signal generating circuit 634 and a sync signal creating circuit 635. The n fsc unit 62 and the sync signal creating circuit 635 are entirely the same as those in the SSG 6 in FIG. 12. FIG. 15 shows the details of each block in the fs unit 64. In FIG. 15, the latch circuit 632 is composed of latch circuits 632a and 632b, and the horizontal sync signal generating circuit 634 is composed of a comparator circuit 634a and a pulse generating circuit 634b. In FIG. 22, a signal 22 denotes timing data including a data 22a and an address 22b; signals 639 and 640 denote output signals from the comparator 634a; and a signal 638 denotes a horizontal sync signal. FIG. 16 shows a timing chart for explaining the process of creating the horizontal sync signal 638. With reference to FIGS. 14 to 16, the operation of the SSG 65 and the microcomputer 7 will be explained below.

In FIG. 14, the microcomputer 7 sends to the latch circuit 632 the timing data (set as a and b in the microcomputer 7) for creating the sync signals adapted to the specification of the sensor 1 whereby the data 22a is latched in the latch circuit 632. The latch circuit (632a or 632b) in which the data 22a should be latched is determined in accordance with the address 22b. Now it is assumed that a value a is held in the latch circuit 632a while a value (a+b) is held in the latch circuit 632b. The values a and (a+b) are two points apart from a time b. Thus, if the values of a and (a+b) are set in the respective latch circuits, the sync signal with a synchronization b can be generated. Namely, if the values a and b are set as input data for the microcomputer 7, a programmable SSG can be realized.

The counter 631, when it receives the control signal 18 from the TG 5, counts the sensor clock fs (number of clocks); the counted value 636 is supplied to the comparator circuit 634a in the horizontal sync signal generating circuit 834. The comparator circuit 634a, when it receives timing data 637a and 637b from the latch circuit 632 and the counted value 636 from the counter 631, determines if the counted value 636 coincides with the timing data 637a or 637b, and outputs '1' or '0' in accordance with the absence or presence of the coincidence. Namely, the comparator circuit 634a produces signals 639 and 640 in the timing chart of FIG. 16. The pulse generating circuit 634b, when it receives the signals 639 and 640, generates the sync signal 638 as shown in FIG. 16 which is in turn sent to the sync signal creating circuit 635. The sync signal creating circuit 635, when it receives the vertical sync signal 625 from the vertical sync signal generating circuit 622 and the horizontal sync signal 638 from the horizontal sync signal generating circuit 634, creates sync signals including CSYNC, CBLK and BF which are in turn sent to the digital signal processing circuit 3. The succeeding operation is the same as in the embodiment of FIG. 11.

Although in the above modified embodiment, the fs unit 64 has been explained only in connection with the arrangement of FIG. 15, a plurality of latch circuits 632 connected in series with a plurality of pulse generating circuits 634 may be arranged in such a manner that signal input/output switches SW1 and SW2 are synchronously connected with any series connection of these latch circuits and pulse generating circuits, thereby providing a plurality of horizontal sync signals defined by series connections of the latch circuits 632 and the pulse generating circuit 634. Further, the latch circuit 632 may be replaced by any component as long as it has a state holding function.

In accordance with the above modified embodiment shown in FIGS. 14 to 17, the programmable SSG and the microcomputer for controlling it are provided so that the timing of the horizontal sync signal can be made variable. Therefore, the sync signal adapted to the sensor to be used can be generated so that the video camera can deal with a plurality of kinds of sensors.

A further modified embodiment of the present invention will be explained below. The basic arrangement of the video camera system according to this embodiment is substantially the same as that in FIG. 11 except the arrangement of FIG. 18. The operation of each of the respective blocks is also the same as that of each of the corresponding blocks in FIG. 11. As seen from FIG. 18, the video camera according to this embodiment is characterized by the provision of a programmable TG 9 and a microcomputer 7 for controlling it. The programmable TG 9, when it receives the timing data 22 from the microcomputer 7 and the sync signals from the SSG 6, a necessary timing control signal by the same latch circuit and pulse generating circuit as those included in the fs unit 64 in the programmable SSG 65 in FIG. 14.

Figure 18:
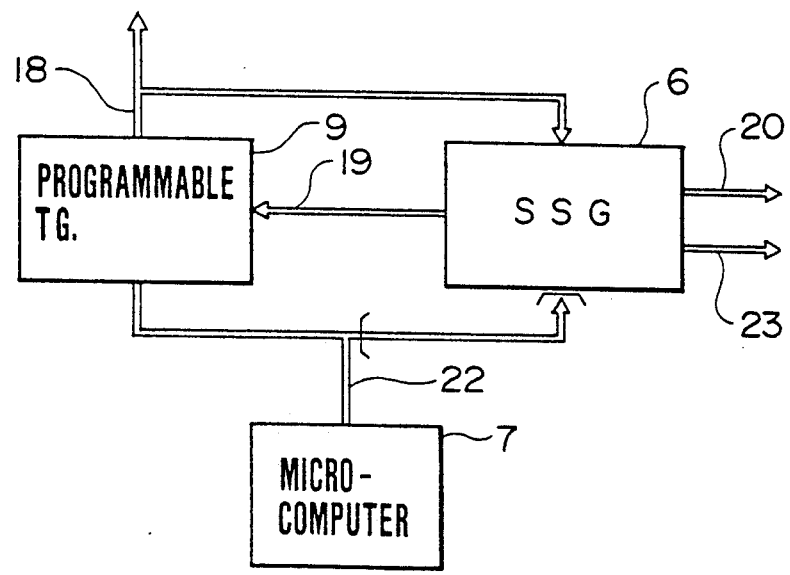
FIG. 18 is a block diagram of the video camera according to still another embodiment of the present invention.

In accordance with the embodiment of FIG. 18, the sensor driving pulse and the control signal for signal processing can be changed in accordance with the kind of the sensor and the system arrangement.

Figure 19:
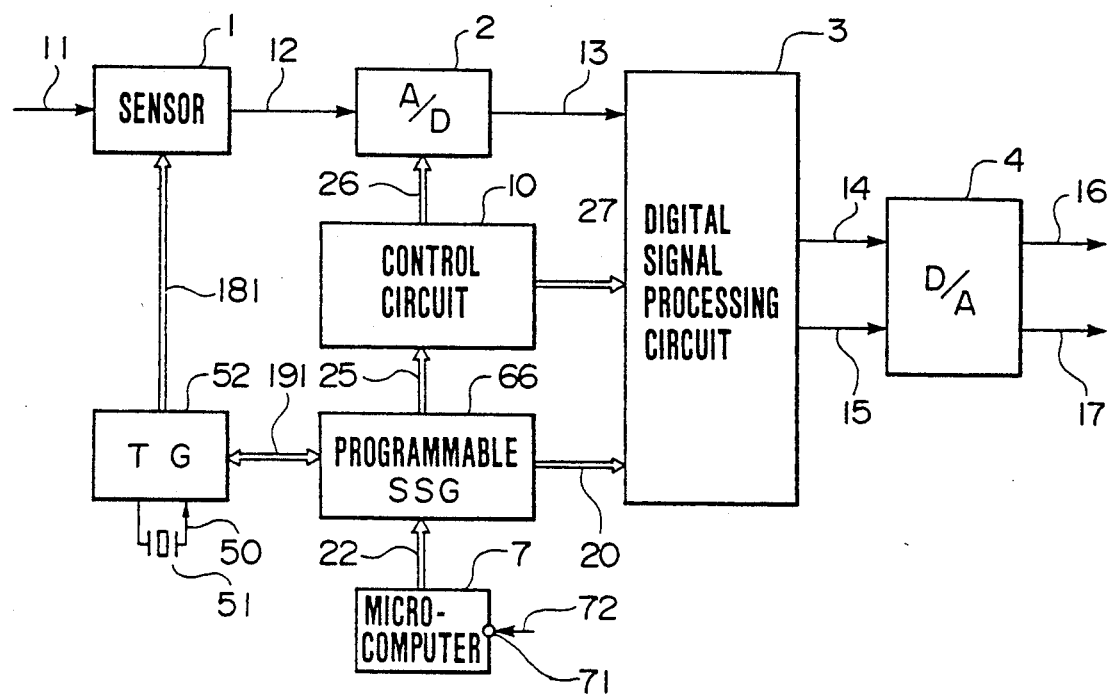
FIG. 19 is a block diagram of the video camera according to yet another embodiment of the present invention.

A still further modified embodiment of the present invention will be explained below. FIG. 19 shows the basic arrangement of the video camera system according to this embodiment. This video camera is composed of a sensor 1, an A/D 2, a digital signal processing circuit 3, a D/A 4, a TG 52, a programmable SSG 6, a control circuit 10 and an oscillation circuit 51.

The operation of the video camera system thus arranged will be explained. Since the respective operations of the sensor 1, the A/D 2, the digital signal processing circuit 3 and the D/A 4 are the same as those of the corresponding components in the embodiment of FIG. 11, only the operations of the other components will be explained below. First, the oscillation circuit 51 supplies a reference signal 50 to the TG 52. The TG 52, when it receives the reference signal 50 from the oscillation circuit 51, frequency-divides the reference signal 50 to create a control signal 191 such as the sensor clock fs and a sensor driving signal 181 for driving the sensor 1 which are in turn sent to the programmable SSG 66 and the sensor 1, respectively. The programmable SSG 66 comprises the same circuits as the fs unit 64. So, through the same process as in the fs unit 64, the programmable SSG 6, when it receives the timing data 22 for generating the sync signals adapted to several sensors from the exterior and the control signal 191 such as the sensor clock fs from the TG 52, creates the sync signals 20 synchronous with the sensor clock fs and the control signals 25 which are in turn sent to the digital signal processing circuit 3 and the control circuit 10, respectively. The control circuit 10, when it receives the control signals from the programmable SSG 66, supplies the control signals such as a clock to the A/D 2, and supplies the control signals such as the sensor clock fs to the digital signal processing circuit 3. Thereafter, the video camera system according to this embodiment produces the analog luminance signal and color signal supplemented with the sync signals through the same process as in video camera system according to the embodiment of FIG. 11.

In accordance with this embodiment, provided is the programmable SSG 66 which can generate sync signals at different timings on the basis of data (information such as a and b required to create sync signals) externally supplied so that the video camera can deal with a plurality of kinds of sensors.

A further modified embodiment of the present invention will be explained. The basic arrangement of the video camera according to this embodiment is that of FIG. 19 further provided with a microcomputer 7 and an input terminal 71 for data rewrite. In FIG. 19, the microcomputer 7 temporarily holds data 72 inputted through the terminal 71 and further supplies the data 72 to the programmable SSG 66 as the timing data 22 to rewrite the timing data held in the SSG 6. It should be noted that the data 72 should be not limited to the timing data 22 and the microcomputer 7 can execute not only the above operation but also control the other circuits as required using the data 72.

As a further modified embodiment, as shown in FIG. 22, the arrangement of FIG. 19 may be provided with a ROM 73. In this case, with the data 72 stored in the ROM 73, the data can be supplied from the ROM 73 to the microcomputer 7. In accordance with this embodiment in which the microcomputer 7 and the ROM 73 for storing the data to be supplied to the microcomputer 7, the programmable SSG 66 can generate the sync signals adapted to the used sensor using the timing data supplied from the microcomputer so that the video camera system according to this embodiment can deal with a plurality of sensors. The video camera can be automatically set up in its start.

Figure 23:
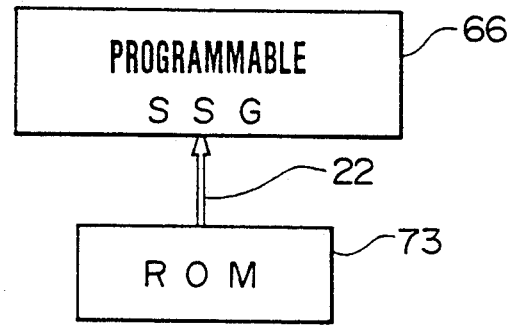

As a further modified embodiment, the arangement of FIG. 22 may be modified into that as shown in FIG. 23. In this case, with the same data as the data 72 stored in a ROM 73, the data timing data 22 which is part of the data stored in the ROM 73 is directly supplied to the programmable SSG 66.

Figure 24:
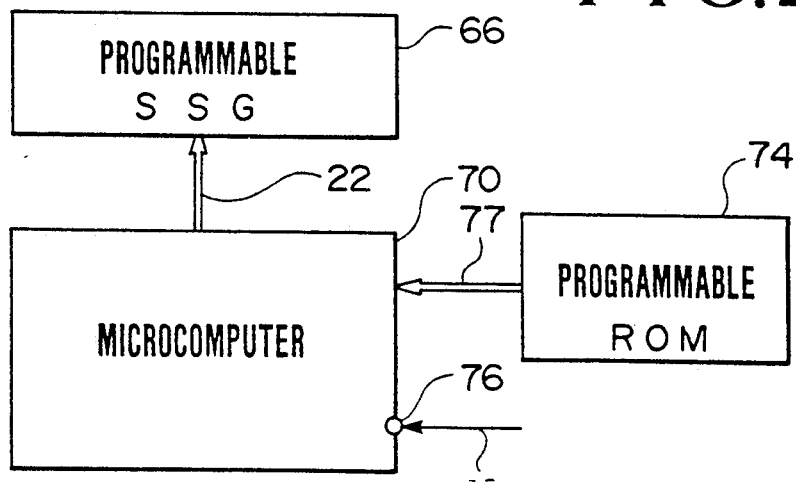

Referring to FIG. 24, a further modified embodiment will be explained. The basic arrangement of the video camera according to this embodiment is substantially the same as that of FIG. 19 except the provision of the arrangement of FIG. 24. In FIG. 24, a microcomputer 70 stores several kinds of timing data corresponding to individual systems, and a programmable ROM 74 stores the codes allotted to the respective systems and control data. A system selection data 78 is supplied to the microcomputer 70 through an input terminal 76. The microcomputer 70, when it receives the system selection data 78, reads, from the programmable ROM 74, system data 77 including the code designated by the selection data 78 and the control data, and supplies to the programmable SSG 66 the timing data 22 designated by the above code of several kinds of timing data stored in the microcomputer 70. And the control data is further supplied to the control circuit 10. The other operations are the same as those of the video camera system in the embodiment of FIG. 19.

In accordance with this embodiment, the system selection data has only to be supplied from the input terminal 76 to automatically place the video camera system in a normally operable state, thereby improving the working efficiency in the production process.

Figure 1:
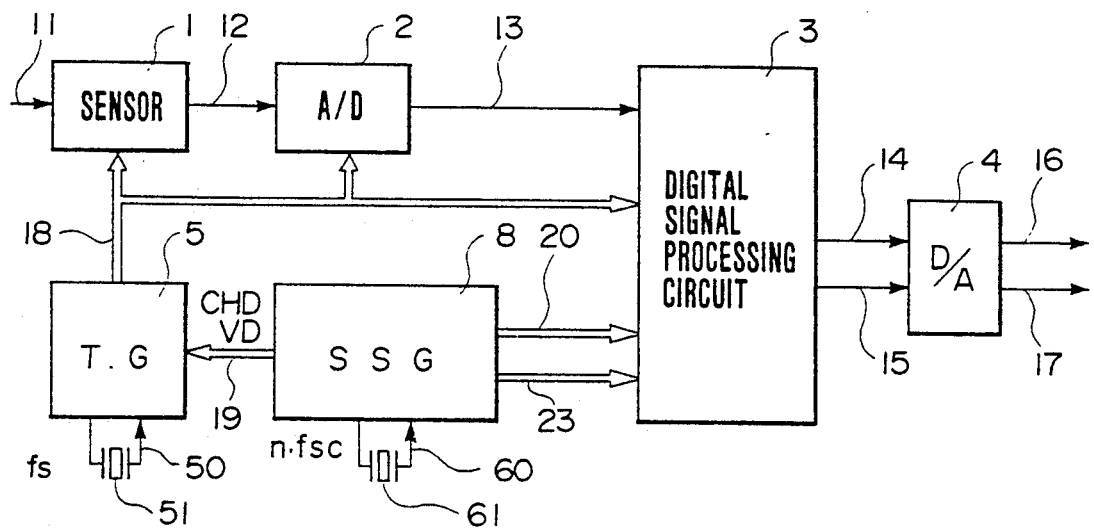
FIG. 1 is a block diagram showing the basic arrangement of the prior art.
Figure 2:
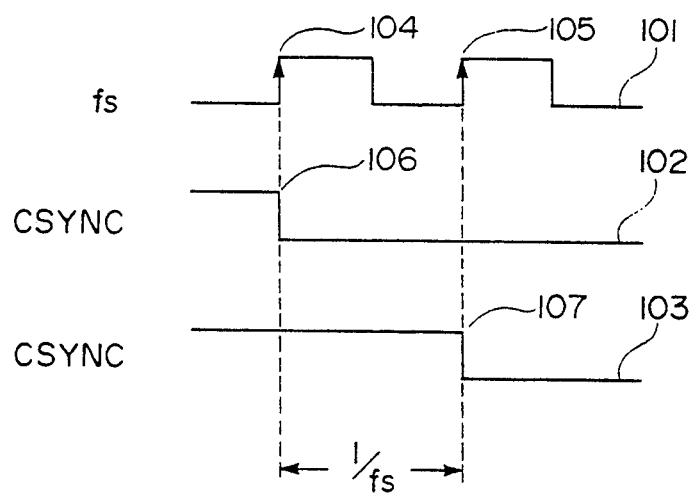
FIG. 2 is a timing chart showing the relationship between the sensor clock and the composite sync signal used in FIG. 1.
Figure 21:
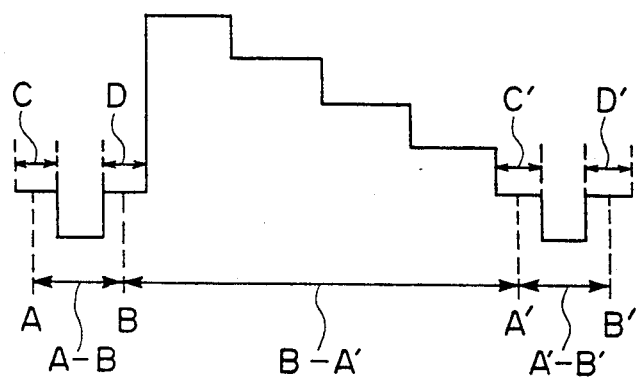
FIG. 21 is a waveform chart of the luminance signal supplemented with the sync signals in FIG. 20.
Figures 20A, 20B:
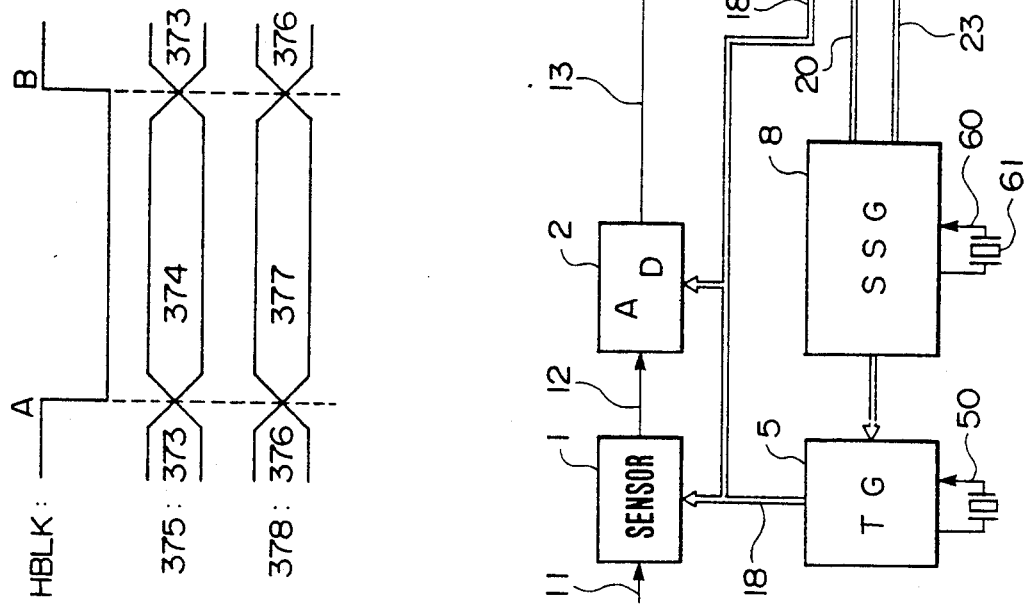
FIG. 20A is a block diagram of the video camera according to a further embodiment of the present invention.
FIG. 20B is a timing chart for explaining the operation of the signal switching circuit in FIG. 20A.

Referring to FIGS. 20A, 20B and 21, an explanation will be given of a further modified embodiment of FIG. 11. The basic arrangement of the video camera system according to this embodiment is substantially the same as the prior art shown in FIG. 1. And the digital signal processing circuit 3 is also substantially the same as that in FIG. 13 except the arrangement of the luminance signal processing unit 37 encircled by a dotted line. FIG. 20A shows a circuit for supplying the luminance signal and sync signals to the D/A converter unit 4. This luminance signal processing circuit is composed of a signal switch 371 and a clock switch 372. FIG. 21 shows the waveform of the luminance signal supplemented with sync signals. Since the basic operation of the video camera according to this embodiment is substantially the same as that of the prior art shown in FIG. 1 except the D/A conversion operation, only the operation of the luminance signal processing unit 37 will be explained.

During the A−B interval in FIG. 21, the signal switch 371 connects a terminal 375 with a terminal 374 to supply the sync signals 20 to the D/A converter unit 4, and the clock switch 372 connects a terminal 377 with a terminal 378 to the n fsc clock to the clock terminal 34 of the D/A converter unit 4. Then, in response to the n fsc clock, the D/A converter unit 4 converts the sync signals into an analog signal to be output as in FIG. 20A. At the time B in FIG. 21, the signal switch 371 is switched into a terminal 373 to supply the luminance signal 303 to the D/A converter unit 4, and the clock switch 372 is switched into a terminal 376 to supply the sensor clock fs which is one of the control signals to the clock terminal 24 of the D/A converter unit 4. Then, in response to the sensor clock fs, the D/A converter unit 4 converts the luminance signal 303 into an analog luminance signal to be output. Such an operation is continued during the interval B−A' until a time A'. At the time A', the signal switch 371 and the clock switch 372 are switched into opposite terminals, respectively so that the same operation as during the above interval A−B. Thereafter, the above operations will be repeated. It should be noted that in FIG. 21, the level of the luminance signal is fixed during all the intervals C, D, C' and D' where the switching timings A, B, A' and B' are located. In order to implement the switching operation in the above signal processing unit 37, the horizontal blanking signal HBLK as shown in FIG. 20B included in the sync signals 20 is supplied to the signal switch 371 and the clock switch 372 as a switching signal. Thus, as seen from FIG. 20B, at the falling edge of the HBLK, the terminals 375 and 378 are connected with the terminals 374 and 377, respectively whereas at the rising edge of HBLK, the terminals 375 and 378 are connected with the terminals 373 and 376, respectively.

In accordance with the embodiment of FIGS. 20A and 20B, the luminance signal and the sync signals are D/A converted at the timings at both ends of the horizontal blanking period where the level of the luminance signal is fixed. Therefore, even if the luminance signal is not synchronous with the sync signals, any jitter influencing the output is not generated.

All the embodiments hitherto explained can be effectively implemented in the general color television system including a PAL system, a SECOM system, etc., as well as the NTSC system. Also, the timing charts should not be limited to those as shown.

In accordance with the embodiments explained in connection with FIGS. 3 to 10, in the video camera provided with the sensor having any number of pixels, the jitter theoretically attendant on the digital encoder based on a 4 fsc clock can be limited in a permissible range of $(8\ fsc)^{-1}$; thus, all of the signal processing systems including the digital encoder can be digitized with no attenuation of image quality. Accordingly, the video camera system having merits of digitization of low power consumption, compactness, light weight, high image quality, etc. can be realized.

In accordance with the embodiments explained in connection with FIGS. 11 to 24, the sync signal generating circuit is composed of a unit for generating a horizontal sync signal and a vertical sync signal in response to the clock at the frequency K (dependent on a color television) times as large as that of a color subcarrier, and a unit for generating sync signals to be added to a luminance signal and color difference signals, and the luminance signal which is not still supplemented with the sync signals is generated on the basis of the horizontal read clock of the sensor used. In such a construction, the luminance signal is made synchronous with the sync signals so that the jitter attendant on the digitization in the signal processing can be removed to realize the high image quality.

Further, provided is a circuit for exchanging the D/A conversion of the luminance signal and the sync signals at the timings of both ends of the horizontal blanking period when the level of the luminance signal is fixed so that the image free from the jitter can be obtained.

Furthermore, by providing a programmable sync signal generating circuit, a sensor driving timing generating circuit and a microcomputer or the like for controlling these circuits, the video camera can be a plurality kinds of sensors, and its versatility and low cost can also be realized.

We claim:

1. A video camera in which an output signal from a solid-state image sensor is converted into a corresponding digital signal at a horizontal reading cycle of an output signal, said corresponding digital signal being digital-processed with a first predetermined clock (fs) synchronous with the reading cycle to provide a luminance signal and a color difference signal, comprising:

data clock converter means for latching said color difference signal generated in synchronism with said first clock with a data latch clock synchronous with a second clock (4 fsc) having a frequency four times as large as that of a color subcarrier (fsc) thereby to convert said color difference signal;

control means for detecting a phase of a changing point of said color difference signal generated in synchronism with said first clock (fs) for said second clock (4 fsc) to provide a phase detecting signal and for supplying said data latch clock, to which color difference signal is latched synchronously, with said second clock (4 fsc) at a stable point after said changing point of said color difference signal generated in synchronism with said first clock (fs);

phase correction means for receiving said color difference signal after conversion from said data clock converter means, and producing a phase-corrected color difference signal by selecting, in accordance with said phase detecting signal from said control means, one of said color difference signal having an intermediate phase obtained by interpolating before and after said changing point of the received color difference signal and said color difference signal after conversion; and modulation means for quadrature-balanced-modulating the color difference signal supplied from said phase correction means to provide a modulated color signal.

2. A video camera according to claim 1, wherein said control means comprises detection means for detecting said changing point of said color difference signal using a rising edge and falling edge of said first clock (fs) for each period ($(4\ fsc)^{-1}$) of said second clock, and said phase correction means selects, in accordance with the phase detecting signal for each period ($(4\ fsc)^{-1}$) of said second clock from said detecting means, either one of the average value of said phase detecting signals before and after said changing point of said color difference signal and an input signal to produce a phase-corrected color difference signal.

3. A video camera according to claim 1, wherein said control means comprises means for detecting which of four phase ranges said changing point of said color difference signal belongs to using said second clock and a clock at a frequency twice as large as that of said second clock, said four phase ranges being formed by dividing one cycle of said second clock into four parts, and said phase correction means forms three signals in intermediate phases in synchronism with said color difference signals before and after said changing point of said color difference signal and selectively outputs one of said three signals in intermediate phases and a input signal to produce a phase-corrected color difference signal.

* * * * *